(12) United States Patent
Eum et al.

(10) Patent No.: US 12,226,739 B2
(45) Date of Patent: Feb. 18, 2025

(54) ALL-NANOPOROUS HYBRID MEMBRANES COMPRISING ZEOLITES AND METAL-ORGANIC FRAMEWORKS SYNTHESIZED THERETHROUGH

(71) Applicants: Phillips 66 Company, Houston, TX (US); Georgia Tech Research Corporation, Atlanta, GA (US)

(72) Inventors: Kiwon Eum, Henderson, NV (US); Shaowei Yang, Atlanta, GA (US); Byunghyun Min, Atlanta, GA (US); Chen Ma, Atlanta, GA (US); Jeffrey H. Drese, Owasso, OK (US); Yash Tamhankar, Bartlesville, OK (US); Ryan P. Lively, Atlanta, GA (US); Sankar Nair, Roswell, GA (US)

(73) Assignee: Phillips 66 Company, Houston, TX (US)

( * ) Notice: Subject to any disclaimer, the term of this patent is extended or adjusted under 35 U.S.C. 154(b) by 723 days.

(21) Appl. No.: 16/803,291

(22) Filed: Feb. 27, 2020

(65) Prior Publication Data
US 2021/0268446 A1 Sep. 2, 2021

(51) Int. Cl.
*B01D 67/00* (2006.01)
*B01D 69/12* (2006.01)
(Continued)

(52) U.S. Cl.
CPC ....... *B01D 67/00933* (2022.08); *B01D 69/12* (2013.01); *B01D 69/148* (2013.01); *B01D 71/0281* (2022.08); *B01D 71/62* (2013.01)

(58) Field of Classification Search
None
See application file for complete search history.

(56) References Cited

U.S. PATENT DOCUMENTS

2013/0064747 A1 3/2013 Zhou et al.
2016/0130199 A1 5/2016 Nair et al.
(Continued)

FOREIGN PATENT DOCUMENTS

CN 108295672 B * 8/2020

OTHER PUBLICATIONS

F. Rashidi, J. Leisen, S.-J. Kim, A. A. Rownaghi, C. W. Jones, S. Nair, Angew. Chem. Int. Ed. 2019, 58, 236. with Supporting Information (Year: 2018).*

(Continued)

*Primary Examiner* — Jason M Greene
*Assistant Examiner* — Eric J McCullough
(74) *Attorney, Agent, or Firm* — Patterson + Sheridan, LLP

(57) ABSTRACT

A method of forming a molecular separation device is provided. The method comprises growing or depositing a silica MFI zeolite coating on a ceramic support. The method further comprises growing a ZIF-8 coating on the silica MFI zeolite coating. Growing the ZIF-8 coating on the silica MFI zeolite comprises applying a first reactant fluid including a metal salt and a second reactant fluid including an imidazole reactant to the silica MFI zeolite coating. Growing the ZIF-8 coating on the silica MFI zeolite further comprises reacting the first and second reactant fluid with the silica MFI zeolite coating to produce the ZIF-8 coating. In certain implementations, at least a portion of the ZIF-8 coating is interspersed with a portion of the silica MFI coating. A molecular separation device including the ZIF-8 coating and the silica MFI zeolite is also disclosed.

20 Claims, 12 Drawing Sheets

(51) Int. Cl.
    *B01D 69/14* (2006.01)
    *B01D 71/02* (2006.01)
    *B01D 71/62* (2006.01)

(56) References Cited

U.S. PATENT DOCUMENTS

2018/0056246 A1* 3/2018 Nair .................... B01D 69/141
2018/0326398 A1 11/2018 Nair et al.

OTHER PUBLICATIONS

Shunsuke Tanaka, Kazuki Sakamoto, Hideaki Inada, Masashi Kawata, Goya Takasaki, and Kota Imawaka Langmuir 2018 34 (24), 7028-7033 (Year: 2018).*
Dispersible Exfoliated Zeolite Nanosheets and Their Application as a Selective Membrane, Kumar Varoon, et al., Science, Oct. 7, 2011, vol. 334, Issue 6052, pp. 72-75 (Year: 2011).*
Agrawal, et. al. (2015), Oriented MFI Membranes by Gel-Less Secondary Growth of Sub-100 nm MFI-Nanosheet Seed Layers. Adv. Mater., 27: 3243-3249. (Year: 2015).*
Brown et al, Interfacial Microfluidic Processing of Metal-organic Framework Hollow Fiber Membranes, Science, vol. 345, Issue 6192, Jul. 4, 2014.
Brown et al, Supplementary Materials for Interfacial Microfluidic Processing of Metal-organic Framework Hollow Fiber Membranes, Science, vol. 345, Issue 6192, Jul. 4, 2014.

* cited by examiner

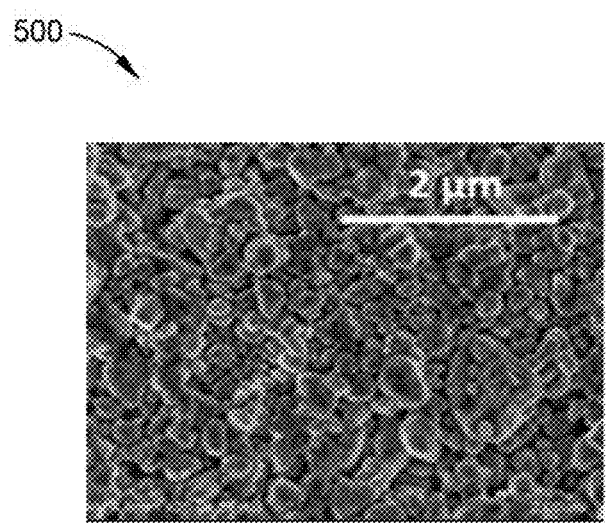
FIG. 5A
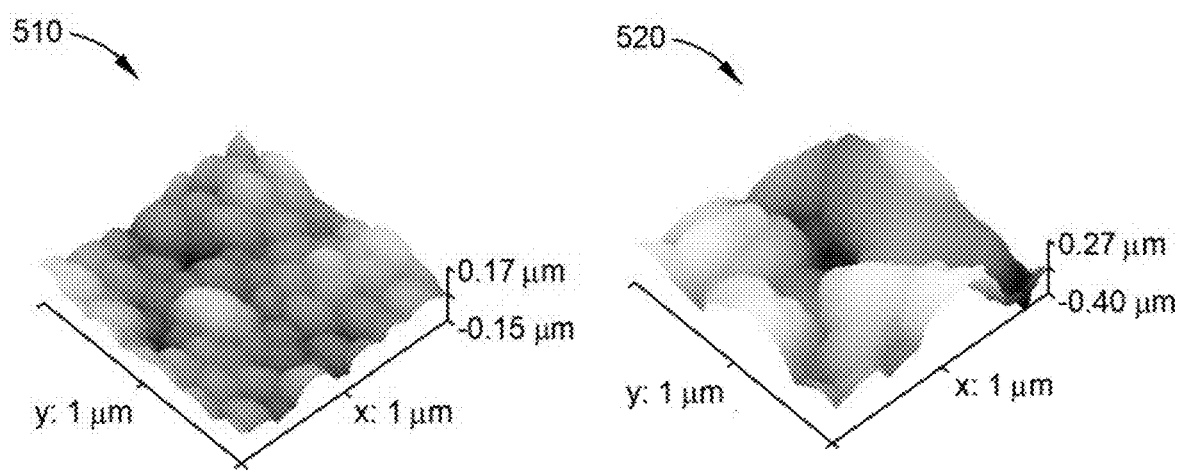
FIG. 5B
FIG. 5C

ALL-NANOPOROUS HYBRID MEMBRANES COMPRISING ZEOLITES AND METAL-ORGANIC FRAMEWORKS SYNTHESIZED THERETHROUGH

STATEMENT REGARDING FEDERALLY SPONSORED RESEARCH

The technology disclosed herein was supported by United States Government award from the Advanced Research Projects Agency-Energy, Award No. DE-AR-0000751. The government has certain rights in this invention.

FIELD

The present disclosure generally relates to molecular separation devices, and methods for producing molecular separation devices comprising hybrid membranes or membranes containing two or more nanoporous materials.

BACKGROUND

Conventional methods of molecular separation and purification, including distillation, rectification, extraction and crystallization, are both energy intensive and expensive. New membrane-based molecular separation processes have been attempted with the goal of achieving sustainable large-scale chemical separation. Unfortunately, conventional polymeric membranes have not achieved the level of permeability, selectivity, and robustness required for successful commercial implementation.

A considerable body of literature describing "hybrid" or "mixed-matrix" membranes has developed over the past two decades, in which nanoparticles of a higher-performance, nanoporous material such as a zeolite, metal-organic framework (MOF), or two-dimensional layered structure are dispersed in polymeric membranes to improve performance while maintaining the superior processability of polymers. However, the performance of such membranes (as defined, for example, by Robeson-type "upper-bound" curves) has been constrained by their associated polymeric matrix.

A broad range of materials such as polymers, carbon molecular sieves (CMS), MOFs, and zeolites have been fabricated into membranes for propylene separation. For example, polymer-based membranes have the advantage of improved processability as compared to nanoporous crystalline membranes, but suffer from a permeability-selectivity trade-off defined by the Robeson upper bound curve. In an effort to achieve improved membrane performance beyond this upper bound, hybrid or mixed-matrix membranes formed by dispersing highly selective and permeable molecular sieve zeolite, CMS, or MOF materials into the polymeric matrix have also been attempted.

However, the transport physics of mixed-matrix membranes (as described, e.g., by the Maxwell model) shows that the performance of such membranes is ultimately constrained by the properties of the polymeric matrix. Assuming sufficiently high loading (e.g., >40 volume %) of the dispersed phase in the polymer, incremental improvement in performance can be obtained over the baseline matrix polymer. However, manufacture of robust and defect-free mixed-matrix membranes with the required highly dispersed phase loadings has proven more difficult than anticipated.

Pure nanoporous membranes have orders-of-magnitude higher performance characteristics than most polymers and polymer-nanoporous material mixed-matrix membranes. However, pure nanoporous membranes face a different challenge, namely the difficulty of facile and scalable fabrication of a large variety of membranes for different applications. Unlike polymeric membranes, which can be fabricated in a rational manner with a vast range of polymer compositions, pure nanoporous membranes typically, involve specialized thin film crystallization, growth, or deposition techniques that vary greatly from one material to another.

Thus, there is a need for molecular separation devices, and methods for producing molecular separation devices having superior separation characteristics.

SUMMARY

The present disclosure generally relates to molecular separation devices, and methods for producing molecular separation devices comprising hybrid membranes or membranes containing two or more nanoporous materials. In one implementation, a method of forming a molecular separation device is provided. The method comprises growing or depositing a porous, nanocrystalline material comprising a zeolite on a ceramic support. The method further comprises growing a porous, polycrystalline material comprising a metal-organic framework (MOF) on the porous, nanocrystalline material. Growing the porous, polycrystalline material comprises applying a first reactant fluid including a metal salt and a second reactant fluid including an imidazole reactant to the porous, nanocrystalline material. Growing the porous, polycrystalline material further comprises reacting the first reactant fluid and the second reactant fluid to produce the porous, polycrystalline material. In certain implementations, at least a portion of the porous, polycrystalline material is interspersed with at least a portion of the porous, nanocrystalline material.

In another implementation, a method of forming a molecular separation device is provided. The method comprises growing or depositing a silica MFI zeolite coating on a ceramic support. The method further comprises growing a ZIF-8 coating on the silica MFI zeolite coating. Growing the ZIF-8 coating on the silica MFI zeolite comprises applying a first reactant fluid including a metal salt and a second reactant fluid including an imidazole reactant to the silica MFI zeolite coating. Growing the ZIF-8 coating on the silica MFI zeolite further comprises reacting the first and second reactant fluid with the silica MFI zeolite coating to produce the ZIF-8 coating. In certain implementations, at least a portion of the ZIF-8 coating is interspersed with a portion of the silica MFI coating.

In yet another implementation, a method of forming a molecular separation device is provided. The method comprises growing or depositing a porous, nanocrystalline material comprising a zeolite on a ceramic support. The method further comprises growing a porous, polycrystalline material comprising a metal-organic framework (MOF) on the porous, nanocrystalline material comprising the zeolite. Growing the porous, polycrystalline material comprising the metal-organic framework (MOF) on the porous, nanocrystalline material comprising the zeolite, comprises applying a first reactant fluid including a metal salt to the porous, nanocrystalline material, converting the first reactant fluid to a metal-containing film by solvent evaporation, applying a second reactant fluid including an imidazole reactant in vapor form to the ceramic support with the porous, nanocrystalline material, and reacting the imidazole reactant vapor with the metal-containing film to convert the metal-containing film into the porous, polycrystalline material. In certain implementations, at least a portion of the porous, polycrystalline material is interspersed with at least a portion of the porous, nanocrystalline material.

In yet another implementation, a molecular separation device is provided. The molecular separation device comprises a porous, polycrystalline membrane material comprising a metal-organic framework (MOF) and a porous, nanocrystalline material comprising a zeolite. At least a portion of the porous, nanocrystalline material is dispersed within the porous, polycrystalline membrane material. The nanocrystalline material provides a plurality of nanoporous structures. The membrane has a propylene permeability greater than 100 barrer and a propylene to propane selectivity greater than 100.

The features, functions, and advantages that have been discussed can be achieved independently in various aspects or can be combined in yet other aspects, further details of which can be seen with reference to the following description and drawings.

BRIEF DESCRIPTION OF DRAWINGS

So that the manner in which the above-recited features of the present disclosure can be understood in detail, a more particular description of the disclosure briefly summarized above can be had by reference to implementations, some of which are illustrated in the appended drawings. It is to be noted, however, that the appended drawings illustrate only typical implementations of this disclosure and are therefore not to be considered limiting of its scope, for the disclosure can admit to other equally effective implementations.

FIG. 5A illustrates a top-view of a scanning electron microscope ("SEM") image of an alpha-alumina support, formed according to implementations described herein;

FIG. 5B illustrates an atomic force microscopy (AFM) image of the surface morphology of an MFI nanoparticle-coated alpha-alumina support;

FIG. 5C illustrates an AFM image of the surface morphology of a bare alpha-alumina support;

To facilitate understanding, identical reference numerals have been used, wherever possible, to designate identical elements that are common to the figures. Additionally, elements of one aspect can be advantageously adapted for utilization in other aspects described herein.

DETAILED DESCRIPTION

Figure 1:
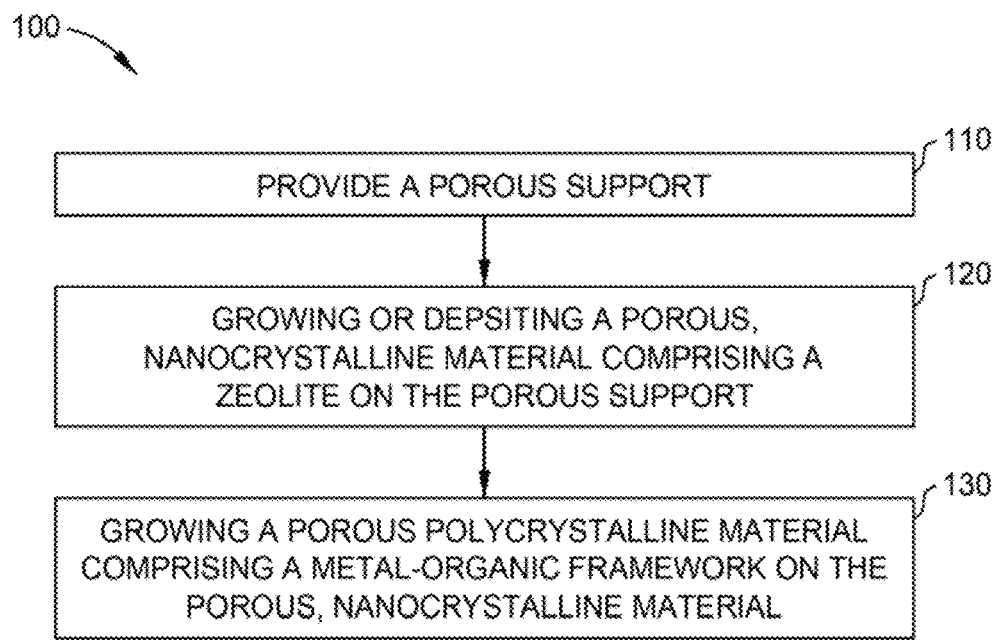
FIG. 1 illustrates a process flow chart summarizing one implementation of a method of forming a molecular separation device according to one or more implementations described herein.

The following detailed description of various implementations of the instant disclosure will be enhanced by reference to the accompanying drawings, which illustrate specific though non-limiting aspects or features of the disclosure, and example methods by which they may be practiced. While the illustrative implementations are described with particularity, it will be understood that various other modifications can be made by those skilled in the art without departing from the scope or spirit of the instant disclosure. Accordingly, it is not intended that the scope of the claims appended hereto be limited to the examples and descriptions set forth herein, but rather that the claims be construed as encompassing one or more of the patentably distinct features disclosed within the present specification, including logical and functional equivalents thereof.

Systems, devices and methods for molecular separation are generally disclosed herein. Generally, the molecular separation devices disclosed herein comprise a composite structure including at least two porous materials. In certain implementations, one of the porous materials may comprise intergrown or contiguous grains of polycrystalline material ranging from micron, to sub-micron, to nanoscale in size, and are further operable to form a continuous membrane. Generally, the methods of making the aforementioned molecular separation device include evaporation-induced transformation of a ZIF precursor solution to a membrane layer, on inexpensive and easily mass-produced substrate materials, for example, a ceramic or a polymer, whose pore structures or surfaces are not specially engineered or modified.

Metal-organic framework (MOF) membranes have attractive molecular separation properties, but require challenging thin film deposition techniques on expensive/specialty supports to obtain high performance levels relative to conventional polymer membranes. Implementations of the present disclosure demonstrate the concept of All-Nanoporous Hybrid Membranes (ANHMs), which combine two or more nanoporous materials of different morphologies into a single membrane without the use of any polymeric materials. Implementations of the present disclosure provide access to a previously accessible region of very high permeability and selectivity properties, a feature that also allows ANHMs to show high performance even when fabricated with simple coating and solvent evaporation methods on low-cost supports. Implementations of the present disclosure involve synthesis of several types of ANHMs that combine the MOF material ZIF-8 with the high-silica zeolite MFI (the latter being employed in both nanoparticle and nanosheet forms). Implementations of the present disclosure demonstrate that continuous ANHMs can be obtained with high (~50%) volume fractions of both MOF and zeolite components. In addition, analysis of the multilayer microstructures of these ANHMs by multiple techniques provides insight into the dramatically increased permeability and selectivity observed in ANHMs in relation to previously available single-phase nanoporous membranes.

Membrane-based processes are of great interest for conducting molecular separations with lower energy consumption and environmental impact. Conventional polymeric membranes are known to face a fundamental trade-off between permeability and selectivity characteristics referred to as the 'Robeson upper bound.' To transcend this limitation, a number of approaches have emerged to construct hybrid or 'mixed-matrix membranes' (MMMs), which incorporate higher-performance nanoporous materials such as metal-organic frameworks (MOFs) or zeolites in the polymeric membrane matrix in order to boost the membrane performance. However, this approach usually allows only a moderate increase in the membrane performance over the baseline polymeric membrane, whereas many pure nanoporous membranes have orders-of-magnitude higher performance characteristics than most polymers and polymer-nanoporous MMMs. However, pure nanoporous membranes face a different challenge, namely the difficulty of facile and scalable fabrication of a large variety of membranes for different applications. Unlike polymeric membranes, which can be fabricated with a vast range of polymer compositions, nanoporous membranes typically require specialized thin film crystallization, growth, or deposition techniques that vary greatly from one material to another.

In the last few years, the fabrication of membranes from nanoporous zeolitic imidazolate frameworks (ZIFs), which are a large subclass of MOFs have attracted much research attention. One aspect of this work is the increasing ability to fabricate molecularly selective and thin (in many cases, submicron) ZIF membrane coatings. A number of methods have been developed to exploit the use of liquid, vapor, and solid phases, as well as electrochemical and electrophoretic techniques, for delivery of precursors (mainly $Zn^{2+}$ metal ions and imidazolate linkers) and ZIF seeds to the membrane substrate, resulting ultimately in the formation of crystalline ZIF membrane coatings. A vast majority of the developed methods have focused on the material ZIF-8, which has been of particular interest for propylene/propane separations.

Implementations of the present disclosure, introduce the concept of AHNM. The ANHM concept involves fabricating hybrid or 'mixed-matrix' membranes containing two (or more) nanoporous materials and no polymeric materials in the membrane layer. Such 'dual-phase' or even 'multi-phase' ANHMs allow access to an entirely new range of permeability and selectivity characteristics that are not possible to achieve with single-phase nanoporous materials, thus surpassing previous "upper bounds" on membrane performance. Selection of the materials described herein allows increases in permeability, selectivity, or both properties as desired. Furthermore, the expected enhancements in permeation properties can be estimated using the same kinds of modeling approaches (such as the Maxwell model and other related formulations) that are currently used for estimating the characteristics of conventional polymer-based MMMs.

In certain implementations of the present disclosure, fabrication of ZIF-8/MFI ANHMs includes both MFI nanoparticles as well as MFI nanosheets. Some implementations of the present disclosure include direct evaporation-based conversion of ZIF-8 precursor solutions to form ZIF-8 membranes. Not to be bound by theory but it is believed that direct evaporation-based conversion has greater potential to yield thin membranes with minimal use of solvents and precursors as compared to full solvothermal growth of polycrystalline ZIF membranes from bulk liquid phases. Some implementations of the present disclosure provide new techniques for enhancing the intrinsic properties of the membrane (permeability and selectivity) through the ANHM approach described herein. The ANHM approach described herein is also compatible with existing methods for production of pure ZIF membranes, and may be used to boost the performance of pure ZIF membranes. The ANHM approach described herein can also be valuable in improving or simplifying the membrane synthesis process itself. The ideal ZIF membrane production process would involve a simple coating of the ZIF precursor solution and its evaporation-induced transformation to a membrane layer, on inexpensive and easily mass-produced substrate materials, for example, a ceramic or a polymer substrate, whose pore structures or surfaces are not specially engineered or modified. However, existing approaches to ZIF membrane formation often require specialized or engineered substrates, whereas ZIF membranes made by simple coating processes on inexpensive substrates typically show poor selectivity. As demonstrated herein, the ANHM approach described herein dramatically improves the quality of ZIF membranes even with use of a simple, non-engineered substrate material.

In certain implementations, the porous membrane material also comprises a second porous material, such as an occluding crystalline material, interspersed therein. In one implementation, the occluding crystalline material is nanoscale in size, though in other implementations the material is either larger or smaller for improved efficacy in various applications.

Generally, the molecular separation device disclosed herein comprises a composite assembly having a porous, polycrystalline membrane interspersed with a porous, nanocrystalline material. In one implementation, the molecular separation device is a permselective nanoporous structure characterized, generally, as a semipermeable membrane capable of ion exchange.

In certain implementations described herein, the specification generally discloses implementations of the present disclosure comprising molecular separation devices having a mixed-matrix membrane, and further comprising a plurality of nanocrystalline members configured for molecular separation of specific target molecules, e.g., liquids or gases. The molecular separation devices generally comprise at least two nanoporous materials configured to form a polycrystalline membrane having nanocrystalline pores. The example implementations disclosed herein are non-limiting, and it is understood that the materials forming the molecular separation devices disclosed herein may be selected from any other suitable materials. For example, the molecular separation devices disclosed herein may comprise materials including MOFs; zeolitic materials, e.g., ALPO, SAPO; silicalites; mixed metal oxides; various nanocrystalline, zeolite MFI, and combinations thereof, e.g., zeolite-zeolite, MOF-MOF, MOF-zeolite; MOF1-MOF2; and MOF1-MOF2-zeolite.

In certain implementations, a nanoporous material comprising a polycrystalline, metal-organic framework (MOF) and a nanocrystalline, zeolite MFI is provided, wherein associated MOF nanoparticles form a nanocrystalline membrane with zeolite MFI nanoparticles dispersed therein, and the MOF nanoparticles contacting the zeolite MFI nanoparticles form a permselective nanoporous structure.

Other implementations comprise a porous, polycrystalline membrane material, and a porous, nanocrystalline material in which the nanocrystalline material is dispersed within the polycrystalline membrane material to form nanoporous structures. As such, example implementations further comprise a mixed-matrix of porous, polycrystalline membrane material and nanocrystalline material.

Various other implementations comprise molecular separation devices having mixed-matrix membranes (MMMs) with a matrix and a dispersed phase. The matrix comprises a nanoporous, polycrystalline material and the dispersed phase is a nanoporous, nanocrystalline material. Together, the polycrystalline matrix and nanocrystalline dispersed phase materials interact to form a molecular separation device having an all-nanoporous composite structure.

Other implementations comprise molecular separation devices having an improved performance range that offer enhanced permeability and/or selectivity as compared to previously known, conventional materials. For example, relative to conventional polymers, the permeability of nanoporous materials are 2-3 orders of magnitude higher than polymers, while the molecular selectivity may be 1-2 orders of magnitude higher. Therefore, implementations within the scope of the present disclosure may comprise molecular separation devices for separation closely related compounds, e.g., such as propylene/propane, that surpass any previously defined Robeson upper bound curves by including an appropriate combination of two (or more) nanoporous materials.

Further implementations of the molecular separation device disclosed herein have a range of porosity. Other implementations comprise completely nanoporous, mixed-matrix membranes (MMMs) comprising, consisting of, or consisting essentially of a nanoporous polycrystalline membrane matrix having other nanoporous crystalline nanoparticles and/or nanosheets dispersed therein. In certain implementations, varying degrees of selected amounts of filler nanoparticles and/or nanosheets are incorporated into the polycrystalline member matrix to provide different degrees of molecular separation selectivity, such as from about 10% to about 98% by weight filler nanoparticles. For example, in certain implementations the molecular separation device includes ZIF-8 and: greater than about 10% by weight MFI nanoparticles and/or MFI nanosheets; greater than about 20% by weight MFI nanoparticles; greater than about 30% by weight MFI nanoparticles and/or MFI nanosheets greater than about 40% by weight MFI nanoparticles and/or MFI nanosheets; greater than about 50% by weight MFI nanoparticles and/or MFI nanosheets; greater than about 60% by weight MFI nanoparticles and/or MFI nanosheets; greater than about 70% by weight MFI nanoparticles and/or MFI nanosheets; greater than about 80% by weight MFI nanoparticles and/or MFI nanosheets; greater than about 90% by weight MFI nanoparticles and/or MFI nanosheets; greater than about 95% by weight MFI nanoparticles and/or MFI nanosheets; or greater than about 98% by weight MFI nanoparticles and/or MFI nanosheets.

In certain implementations, the ZIF-8 is nanoporous, and has its own selectivity and permeability towards gases. The incorporated MFI is also nanoporous and has its own selectivity and permeability. Together, the two nanoporous materials form a semi-continuous nanoporous membrane structure that has a separation performance that is some combination of the properties of each material. For example, the combination may have certain ranges of pore sizes. For example, in some implementations, the molecular separation device may have pores ranging in size from about 0.1 nm to about 1000 nm. In other implementations, pore sizes range from about 0.1 nm to about 100 nm. In other implementations, pore sizes range from about 0.1 nm to about 10 nm. In other implementations, pore sizes range from about 0.1 nm to about 1 nm, for example, pore sizes in a range from about 0.4 nm to about 0.6 nm.

Other example implementations comprise molecular separation devices having a dispersed phase having superior molecular permeability and increased permeability even at moderate loadings without significant loss in selectivity. In some implementations of the present disclosure, the molecular separation device may be configured to have a pore-size ranging from about 0.1 nm to about 1,000 nm. In other implementations of the present disclosure, the molecular separation device may be configured to have a pore-size ranging from about 0.1 nm to about 100 nm. In some implementations of the present disclosure, the molecular separation device may be configured to have a pore-size ranging from about 0.1 nm to about 10 nm. In various other implementations, the molecular separation device is configured to have a pore-size ranging from about 0.1 nm to about 1 nm. In one specific though non-limiting implementation, a molecular separation device having pure-silica ($SiO_2$) form of zeolite MFI, e.g., silicate-1, as the dispersed-phase material is provided. MFI is, in general, a medium-pore zeolite with an interconnected quasi-3D network of channels having an average pore size of about 0.55 nm.

In further implementations, the molecular separation device comprises a polymer-free, crystalline, all-nanoporous structure. For example, ZIF-/MFI is polymer-free. The crystalline, all-nanoporous structure does not contain any polymer material, with polymer material being defined as polymers formed from organic monomers, such as, for example, polypropylene, polyimide, polysulfones, and polysiloxanes.

In further implementations, the molecular separation device is used in a plurality of chemical separation applications and related processes, e.g., separation of closely related molecular species. Further example implementations comprise a molecular separation device capable of separating molecules sharing a high degree of structural and chemical similarity. In one specific though non-limiting implementation, a molecular separation device is provided for separation of an olefin-class molecular species from a paraffin-class molecular species, e.g., propylene/propane.

Selected combinations of MOF and zeolite enable the molecular separation devices to separate mixtures of various properties and components, including mixtures of light gases, aqueous solutions of alcohols, mixtures of water and hydrocarbons, e.g., alkanes or higher alcohols, as well as mixtures of hydrocarbons, e.g., alcohol/alcohol, alcohol/alkane or alkane/alkane. Conventionally, such mixtures have been separated by distillation, but also by other methods such as absorption and adsorption.

Further example implementations provide molecular separation devices comprising nanoparticles having a high-performance nanoporous material, e.g., zeolite, MOF, or two-dimensional layered structures. In further implementations, the molecular separation devices comprise two or more associated interspersed nanoporous materials disposed on a polymeric support.

Example implementations of the molecular separation devices disclosed herein comprise a MMM having a crystalline membrane matrix, e.g., ZIF-8, and a crystalline dispersed phase, e.g., zeolite MFI configured to form nanoporous structures.

In certain implementations, the molecular separation devices are produced using an ANHM method. ANHM processing methods offer a versatile platform for fabrication of molecular separation devices including, e.g., MMMs, in a single step on supports. The use of ANHM processing methods can overcome previously known challenges associated with producing or growing a defect-free polycrystalline nanoporous membrane matrix, while simultaneously incorporating crystals of a second nanoporous material with negligible interfacial defects.

In one example implementation, use of ANHM methodologies described herein allow for production of an MMM-based molecular separation device wherein nanoparticles of the zeolite MFI is incorporated in-situ during growth of a polycrystalline membrane of the MOF ZIF-8.

In another example implementation, use of ANHM methodologies described herein allow for production of an MMM-based molecular separation device wherein nanosheets of the zeolite MFI is incorporated in-situ during growth of a polycrystalline membrane of the MOF ZIF-8.

In yet another example implementation, use of ANHM methodologies described herein allow for production of an MMM-based molecular separation device wherein nanosheets and nanoparticles of the zeolite MFI are incorporated in-situ during growth of a polycrystalline membrane of the MOF ZIF-8.

In certain implementations, the growth process of nanoporous, polycrystalline membrane matrices is integrated with inclusion of one or more dispersed phase materials. For example, an MOF material, e.g., ZIF-8, can be characterized as a molecular sieving material with excellent propylene/propane permeation selectivity (>100), and used in the fabrication of high-quality membrane-based molecular separation devices. However, the propylene permeability of ZIF-8 (about 390 barrer at 308 K) is relatively low among nanoporous materials. To improve on the permeability of MOF membrane, additional nanoparticles and/or nanosheets, e.g., a zeolite MFI, are also incorporated.

Further implementations comprise synthetic production of zeolite nanoparticles. In certain implementations, the zeolite synthesis employs reagents and materials including (but not limited to) tetrapropylammonium hydroxide (TPAOH, 20% and 40% w/w aqueous solution and 1M); silica; sodium hydroxide; and deionized water.

In one example implementation, the zeolite nanoparticle synthesis is performed by generating a precursor solution comprising $SiO_2$, TPAOH (40%), sodium hydroxide, and water at a molar ratio of 0.33 $SiO_2$:0.1 TPAOH: 0.035 NaOH: 5.56$H_2O$. In further implementations, sodium hydroxide pellets are dissolved in 1 M TPAOH, followed by fumed silica at 353 K. The precursor is aged at room temperature for a predefined time, e.g., about 4 hours before receiving hydrothermal treatment. Hydrothermal treatment is performed at 393 K for a predefined time, e.g., about 12 hours. In further implementations, additional DI water is added to the solution while stirring for a predefined time, e.g., for about 24 hours, in order to achieve a desired molar ratio.

In other implementations, a hydrothermal reaction is achieved in a Teflon-lined Parr autoclave at about 150 degrees Celsius for about 96 hours. In further implementations, the resulting MFI crystal suspension is centrifuged, washed with water, and then dried at about 100 degrees Celsius in order to recover the crystals, which are then further calcined at about 550 degrees Celsius for about 8 hours in air in order to remove TPA cations occluding pores.

In one example implementation, zeolite nanoparticles are further processed to modify the zeolite nanoparticle surface. Surface functionalization is accomplished by treating the zeolite with an organic compound, e.g., amine. Organic functionalization of zeolite nanoparticles, e.g., MFI, is then performed under neat conditions as presently known in the art or under other conditions future devised offering similar efficacy.

FIG. 1 illustrates a process flow chart summarizing one implementation of a method 100 of forming a molecular separation device according to one or more implementations described herein. The method 100 may be used to form the molecular separation device as described herein.

At operation 110, a porous support is provided. The porous support can be organic or inorganic. Examples of organic supports include polymers such as polypropylene, polyethylene, polytetrafluoroethylene, polysulfone, polyimide, polyamide-imide (PAI) hollow fiber supports, and the like. Examples of inorganic supports include a ceramic sintered body such as silica, alpha-alumina, gamma-alumina, aluminosilicate, mullite, zirconia, titania, yttria, silicon nitride, and silicon carbide, a sintered metal such as iron, bronze and stainless steel, glass, and a carbon molding.

In one implementation, the porous support has an average pore diameter of from about 50 nanometers to about 1,000 nanometers, for example, from about 100 nanometers to about 200 nanometers, and a porosity, for example, of from about 10% to about 60%, such as from about 30% to about 50%. The porosity or degree of porosity is understood to be the ratio of the pore volume to the total volume of the support structure. Pore diameters smaller than 50 nanometers are less suitable due to the insufficient permeation flow rates. A porosity of less than 10% also produces a large reduction in the permeation flow rate. If the pore diameter is larger than 1,000 nanometers a decrease in selectivity may occur. A porosity of higher than 60% may also result in a decrease in selectivity and in the strength of the material.

In certain implementations, the porous support has a room-temperature propylene permeance and propane permeance of about >1,000 gas permeation units.

The porous support is not subject to any limitations regarding its overall shape or geometry. One type of geometry for separation applications includes tubes or cylinders of a length of 10 to 100 cm and having an external diameter of at least 10 mm and a tube thickness of at least 0.2 mm to several millimeters. The porous, nanocrystalline material can be formed on the internal and/or external surface of the tubular support structure, and preferably to the external surface. The porous structure can also be a cylindrical structure having an external diameter of 30 to 100 mm and a length of 20 to 100 cm and a large number of longitudinal channels with diameters of 2-12 mm. However, disks, plates, beads, honeycomb structures, and the like may be suitable in certain applications.

In one example implementation, the alpha-alumina support can be produced by known conventional processes. Such alpha-alumina supports typically have a pore size of about 100 nanometers and room-temperature propylene and propane permeances of about >1,000 gas permeation units.

At operation 120, a porous, nanocrystalline material comprising a zeolite is grown or deposited on the porous support. In one implementation, the zeolite is a pure-silica MFI zeolite. The zeolite may be in nanosheet or nanoparticle form. Examples of pure-silica MFI zeolites include high-aspect ratio (2D) MFI nanosheets, isotropic 3D MFI nanoparticles, or a combination thereof. In one implementation, growing the porous, nanocrystalline material on the porous support comprises subjecting the porous support to a dip coating process or a vacuum-assisted filtration process. In one example, the porous support is coated with a layer of 3D MFI nanoparticles, optionally followed by coating the 3D MFI nanoparticles with a layer of 2D MFI nanosheets. In another example, the porous support is coated with a layer 2D MFI nanosheets, optionally followed by coating the 2D MFI nanosheets with a layer of 3D MFI nanoparticles.

In another implementation, previously formed porous, nanocrystalline material is deposited on the porous support. In one example, a surface other than the porous support is coated with a layer of 3D MFI nanoparticles, optionally followed by coating the 3D MFI nanoparticles with a layer of 2D MFI nanosheets. In another example, a surface other than the porous support is coated with a layer 2D MFI nanosheets, optionally followed by coating the 2D MFI nanosheets with a layer of 3D MFI nanoparticles.

In one implementation, the MFI nanoparticles have an average diameter from about 10 nanometers to about 500 nanometers, for example, from about 50 nanometers to about 200 nanometers. In one implementation, the MFI nanosheets have an aspect ratio (diameter/thickness) of approximately 100. The MFI nanosheets may have a diameter from about 10 nanometers to about 500 nanometers, for example, from about 50 nanometers to about 200 nanometers.

At operation 130, a porous, polycrystalline material comprising a metal-organic framework (MOF) is grown on the porous, nanocrystalline material. In certain implementations, the MOF is a zeolitic imidazolate framework (ZIF). Examples of suitable ZIF materials include ZIF-8, ZIF-90, or a hybrid, mixed linker ZIF. In certain implementations, growing the porous, polycrystalline material comprises applying a first reactant fluid including a metal salt and a second reactant fluid including an imidazole reactant to the porous, nanocrystalline material. The first reactant fluid and the second reactant fluid may be mixed prior to applying the first reactant fluid and the second reactant fluid to the porous, nanocrystalline material. Growing the porous polycrystalline material may further comprise reacting the first reactant fluid and the second reactant fluid to product the porous, polycrystalline material. Reacting the first reactant fluid and the second reactant fluid may comprise at least one of subjecting to ambient conditions, heating, or crystallizing by cooling past supersaturation.

In certain implementations, growing the porous, polycrystalline material comprises applying a first reactant fluid including a metal salt to the porous, nanocrystalline material. The first reactant fluid is then converted to a metal-containing film by a solvent evaporation process. Growing the porous, polycrystalline material further comprises applying a second reactant fluid in vapor form to the porous support and metal-containing film to convert the metal-containing film into the porous, polycrystalline material. The solvent evaporation process may include at least one of subjecting to ambient conditions, heating, or crystallizing by cooling past supersaturation.

In certain implementations, the metal salt is a zinc metal salt. Examples of zinc metal salts include zinc acetate dehydrate. In certain implementations, the imidazole reactant is an imidazole linker molecule. Examples of the imidazole linker molecule include 2-methylimidazole linker or 2-carboxyimidazole linker.

In certain implementations, the MOF material ZIF-8 is constructed from $Zn^{2+}$ ions and 2-methylimidazole (2-MeIM) linkers. ZIF-8 has a 3D pore network with a nominal crystallographic limiting pore diameter of 0.35 nm. However, the rotational flexibility of the linkers surrounding the pore leads to a much larger effective pore size ~0.42 nm. As a result, ZIF-8 can permeate propylene ($C_3H_6$, kinetic diameter 0.42 nm) with an intrinsic room-temperature permeability of ~300 Barrer (1 barrer=$3.348 \times 10^{-16}$ mol·m$^{-1}$·s$^{-1}$·Pa$^{-1}$), but retards permeation of propane ($C_3H_8$, kinetic diameter 0.43 nm) to ~2 barrer. For this reason, ZIF-8 is attractive for propylene/propane separation. On the other hand, the pure-silica ($SiO_2$) MFI zeolite has much larger pores (~0.53 nm), with very high propylene permeability (>8000 Barrer) but nearly no selectivity over propane.

The ZIF-8 precursor solution infiltrates into the MFI inter-particle/inter-sheet spaces, and solvent evaporation induces supersaturation and ZIF-8 crystallization. The solvent evaporation process includes direct evaporation-based conversion of the reactant fluids, in which crystal growth is driven by removal of the solvent via evaporation, increasing the relative concentration of the ZIF-8 precursors that remain behind on the surface of the support. This direct evaporation-based conversion is in contrast to full solvothermal growth from bulk phase liquids in which the ZIF-8 precursors react in solution, eventually linking together in a crystalline repeating pattern that becomes too large and precipitates from solution. In full solvothermal growth, the crystals continue to grow, eventually terminate, and unreacted precursors are finally washed away

EXAMPLES

The following non-limiting examples are provided to further illustrate aspects described herein. However, the examples are not intended to be all-inclusive and are not intended to limit the scope of the aspects described herein. The particular materials and amounts thereof, as well as other conditions and details recited in these examples should not be used to limit the implementations described herein. Examples of the present disclosure are identified by the letter "E" followed by the sample number while comparative samples, which are not examples of the present disclosure are designated by the letter "C" followed by the sample number.

A description of the raw materials used in the examples is as follows:

| | |
|---|---|
| ZnAc·H$_2$O | Zinc Acetate dihydrate. Available from SIGMA-ALDRICH ®. |
| 2-MeIM | 2-Methylimidazole. Available from SIGMA-ALDRICH ®. |
| DMAc | Dimethylacetamide. Available from Acros Organics. |
| MeOH | Methanol. Available from VWR International, LLC. |
| N,N,N',N'-tetramethyl-1,6-diaminohexane | Available from SIGMA-ALDRICH ®. |
| 1-bromohexane | Available from SIGMA-ALDRICH ®. |
| 1-bromodocosane | Available from Tokyo Chemical Industry Co., Ltd. |
| TEOS | Tetraethyl Orthosilicate (TEOS) |
| 1M TPAOH | 1M tetrapropylammonium hydroxide solution. Available from SIGMA-ALDRICH ®. |
| NaOH | Sodium hydroxide. Available from SIGMA-ALDRICH ®. |
| H$_2$SO$_4$ | Sulfuric acid. Available from SIGMA-ALDRICH ®. |
| SiO$_2$ | Silica, fumed. Available from SIGMA-ALDRICH ®. |

Alumina Disk Support Preparation.

Disk substrates were prepared by procedures similar to work of Gu et al. as described in *Microporous Mesoporous Mater.* 2009, 118, 224. The alumina powder was pressed at 130-bar pressure in a module with diameter of 25 mm. The grain disk was then sintered at 1423 K for 6 h to consolidate the disk with ramping rate of 5 K/min. The resulting disk had diameter of ~24 mm. The disk was polished with 600 mesh silicon carbide sand paper before usage. The disk was ~2 mm thick and had average pore size around 100 nm.

MFI Nanoparticle Synthesis.

MFI nanoparticles were prepared by a procedure similar to the work of Tang et al. as described in *Microporous Mesoporous Mater.* 2009, 118, 224. The precursor solution used for synthesis had a molar ratio of 0.33 SiO$_2$:0.1 TPAOH:0.035 NaOH:5.56H$_2$O. The precursor solution was prepared by first dissolving NaOH pellets in 1 M TPAOH solution, followed by fumed silica at 353 K. The precursor was aged at room temperature for 4 hours before receiving hydrothermal treatment. Hydrothermal treatment was conducted at 393 K for 12 hours. The particles were thoroughly rinsed with DI water before being used for substrate coating.

2D MFI Nanosheet Suspension Preparation.

Layered 2D MFI materials were synthesized via a hydrothermal reaction using C$_{22}$H$_{45}$—N(CH$_3$)$_2$—C$_6$H$_{12}$—N(CH$_3$)$_2$—C$_6$H$_{13}$]Br$_2$ (C$_{22-6-6}$) as the structure-directing agent (SDA) as described by Choi et al. in *Nature* 2009, 461, 246. Firstly, as-synthesized C$_{22-6-6}$ was dissolved in deionized water at room temperature, followed by addition of sodium hydroxide. After complete dissolution, TEOS was added dropwise under vigorous stirring. Appropriate amount of sulfuric acid was added into the solution to adjust the pH condition. The final gel composition was 30 Na$_2$O:100 SiO$_2$:18 H$_2$SO$_4$:8000 H$_2$O. After vigorous stirring at room temperature for 24 hours to form a homogeneous gel, the resulting gel was transferred to a Teflon®-lined autoclave and heated at 423 K for 5 days under rotation (40 rpm). The solid product was recovered by centrifugation and washed with deionized water and dried at 333 K. As-prepared layered MFIs were exfoliated by melt compounding as reported by Varoon et al. in *Science* 2011, 334, 72. Next, 2.4 g of melt compounded MFI-polystyrene nanocomposites (4% zeolite (w/w)) were dispersed in 192 mL of toluene and centrifuged at 8500 rpm for 30 minutes. The sediment(s) was dispersed and centrifuged again to eliminate the polystyrene. Purification by density gradient centrifugation was employed to obtain 2D MFI nanosheets coating suspension without unexfoliated particles as reported by Agrawal et al. in *AIChE J.* 2013, 59, 3458. In the process, the sediment(s) after removing the polystyrene was redispersed in 120 mL of octanol. A nonlinear density gradient was formed by sequentially placing 5 mL chloroform, 5 mL dichloromethane, 10 mL chlorobenzene, and 20 mL 2D MFI nanosheets suspension in octanol in a 50 mL centrifuge tube. After centrifugation at 8500 rpm for 30 minutes, top 20 mL of the solution was collected and used as a 2D MFI coating suspension.

Coating of Alumina Supports with 3D MFI Nanoparticles:

An aqueous solution containing 0.4% (wt.) MFI nanoparticles and 1% (wt.) polyethyleneimine (PEI) was used for disk substrate coating. Dip coating was conducted for 5 seconds. The coated disks were dried at 333 K oven overnight and then calcined at 823 K for 6 hours with ramping rate of 2 K/min before usage.

Coating of Alumina Supports with 2D MFI Nanosheets:

The 2D MFI nanosheet coatings were performed by a vacuum-assisted filtration method. The sonicated 45 mL of the coating suspension was poured over the alumina disk, which is held inside the homemade filtration module and vacuum was applied. After complete filtration, the disk was dried at 383 K overnight and calcined at 823 K for 6 hours with a ramping rate of 2 K/min to remove the organic structure-directing agent from a MFI framework.

Coating with ZIF-8:

A first solution containing 1.32 g of zinc acetate dihydrate dissolved in a 15 ml of 2:1 (vol/vol) dimethylacetamide/DI-water solvent (Solution 1) was prepared. Solution 1 showed a cloudy texture upon mixing. Then, 1 g of 2-methylimidazole was dissolved in another batch of 15 ml of 2:1 (vol/vol) ratio dimethylacetamide/DI-water solvent (Solution 2). Then, Solution 1 was dissolved in Solution 2 dropwise while stirring, thereby obtaining a clear/transparent solution. This solution was stirred for 15 minutes upon which cloudiness was again observed. Then, the α-alumina supports (either bare or already coated with various MFI materials as described above) were dip-coated in this solution for 10 seconds, transferred to an oven preheated to 473 K and cured for 15 minutes, cooled at ambient conditions, solvent-exchanged with methanol for 12 hours, and dried under ambient conditions. Degassing of each membrane was performed at 393 K for 8 hours under 10 sccm argon sweep condition before gas permeation measurements.

Comparative Example 1 (C1): ZIF-8 Membrane on Alumina Substrate

The ZIF-8 membrane was formed on alpha-alumina supports as described above in "Coating With ZIF-8."

Example 1 (E1): 3D MFI Nanoparticles/ZIF-8 Membrane on Alumina

The 3D MFI nanoparticles were deposited on the alpha-alumina supports as described above in "Coating of Alumina Supports With 3D MFI Nanoparticles." The ZIF-8 membrane was then formed on the 3D MFI nanoparticles as described above in "Coating With ZIF-8."

Example 2 (E2): 2D MFI Nanosheet/ZIF-8 Membrane on Alumina

The 2D MFI nanosheets were deposited on the alpha-alumina supports as described above in "Coating of Alumina Supports With 2D MFI Nanosheets." The ZIF-8 membrane was then formed on the 2D MFI nanosheets as described above in "Coating With ZIF-8."

Example 3 (E3): 3D MFI Nanoparticles/2D MFI Nanosheets/ZIF-8 Membrane on Alumina Substrate The 3D MFI nanoparticles were deposited on the alpha-alumina supports as described above in "Coating of Alumina Supports With 3D MFI Nanoparticles." The 2D MFI nanosheets were deposited on the 3D MFI nanoparticles as described above in "Coating of Alumina Supports With 2D MFI Nanosheets." The ZIF-8 membrane was then formed on the 2D MFI nanosheets as described above in "Coating With ZIF-8."

Figure 2:
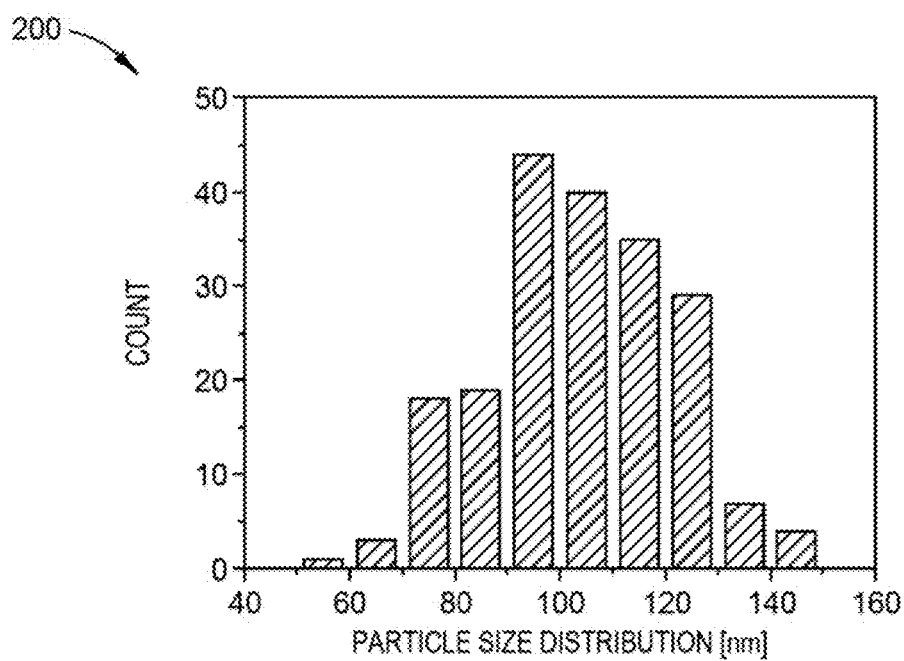
FIG. 2 illustrates a plot depicting the crystal size distribution of 3D MFI nanoparticles formed according to one or more implementations described herein.

FIG. 2 illustrates a plot 200 depicting the crystal size distribution of 3D MFI nanoparticles formed according to one or more implementations described herein. The crystal size distribution was obtained by each randomly analyzing approximately 200 crystals using transmission electron microscopy (TEM). As shown in the plot 200 of FIG. 2, the average crystal size distribution of MFI nanoparticles obtained from the TEM images is 104±17 nm. Low-magnification TEM images of the exfoliated 2D MFI nanosheets confirm their thin flake-like morphology with 100-200 nm lateral size. HRTEM imaging and fast Fourier transform (FFT) analysis confirm the highly ordered MFI nanopores and the high crystallinity.

Figure 3:
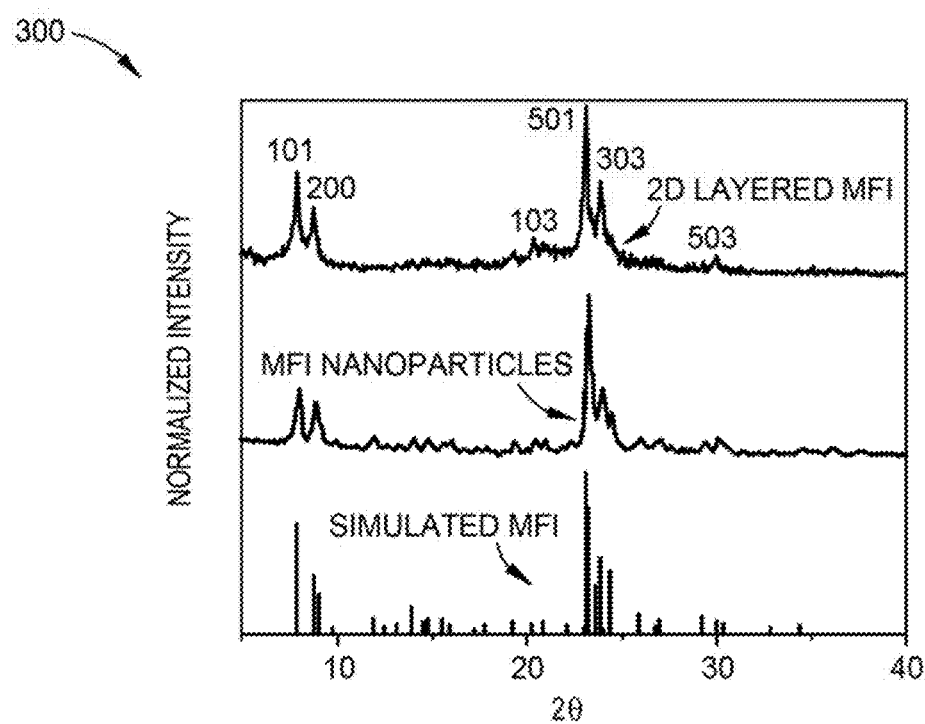
FIG. 3 illustrates a plot of 2Θ(°) vs. normalized intensity (AU) showing powder x-ray diffraction ("XRD") patterns of MFI nanoparticles and MFI nanosheets formed according to one or more implementations described herein.

FIG. 3 illustrates a plot 300 of 2Θ(°) vs. normalized intensity (AU) showing Powder X-ray diffraction (PXRD) patterns of MFI nanoparticles and MFI nanosheets formed according to one or more implementations described herein. Simulated MFI diffraction peak positions are also shown for comparison. The PXRD patterns depicted in FIG. 3 also confirm the MFI structure of these materials. As expected, the PXRD patterns of the as-made 2D MFI material shows only sharp (h0l) reflections because the layered MFIs were grown preferentially in the a-c crystallographic plane with the unit-cell thickness in the b-direction.

Figure 4:
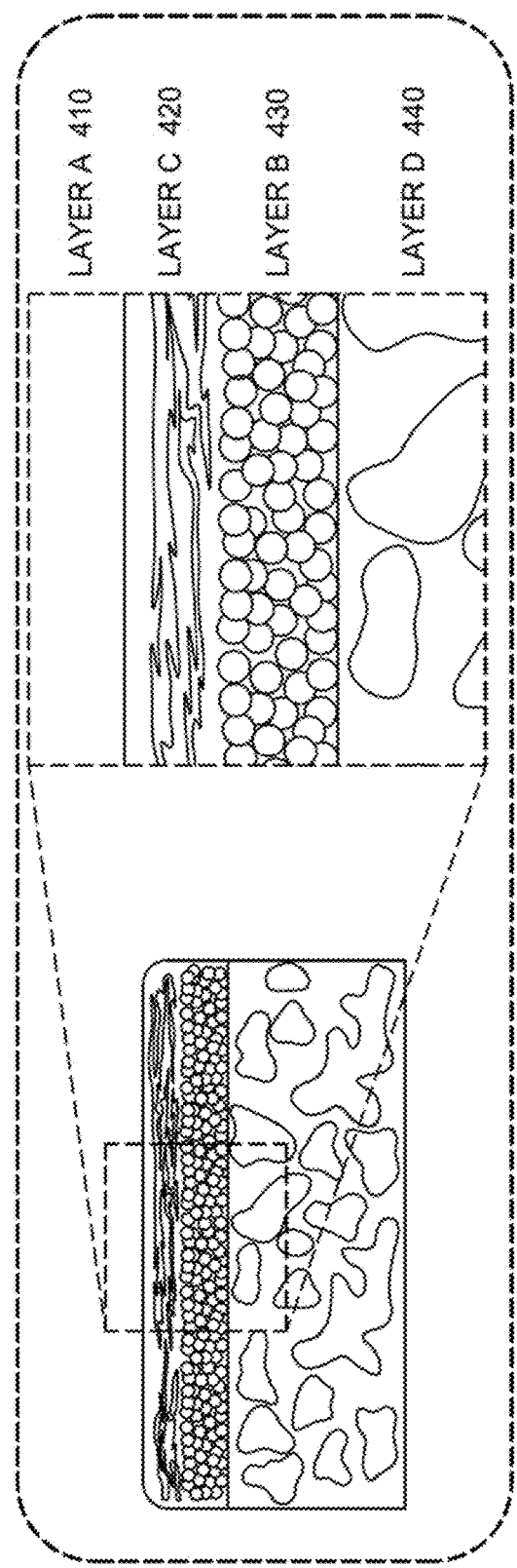
FIG. 4 illustrates a schematic side view of an All-Nanoporous Hybrid Membrane ("ANHM") containing various layers formed according to implementations described herein.

FIG. 4 illustrates a schematic side view of an ANHM 400 containing various layers formed according to implementations described herein. In general, the membranes of Example C1 and Examples E1-E3 display four possible types of layers, which are indexed as Layer A 410 (pure ZIF-8 layer), Layer B 430 (ZIF-8/MFI nanoparticle ANHM layer), Layer C 420 (ZIF-8/MFI nanosheet ANHM layer), and Layer D 440 (ZIF-8 penetrated into the bulk alumina support). FIG. 4 depicts these layers schematically using the membrane of Example 3 as an example, since it contains all four Layers A-D.

In addition to pure ZIF-8 membranes on alpha-alumina supports (Example C1), three types of ZIF-8/MFI ANHMs on alpha-alumina supports were prepared. ZIF-8 with MFI nanoparticles only (Example E1), ZIF-8 with MFI nanosheets only (Example E2), and ZIF-8 with MFI nanoparticles and MFI nanosheets (Example E3). In Examples E1-E3, MFI coatings were first made on the bare alumina support before coating with ZIF-8. For Example E1, MFI nanoparticles were dispersed in a dilute polyethyleneimine (PEI) solution as a binder and then dip-coated on the bare alumina support. For Example E2, an MFI nanosheet suspension was vacuum-filtered on to the bare alumina support. For Example E3, the operations of Example E1 and Example E2 were performed in order to obtain a dual layer that contains an MFI nanosheet layer on top of an MFI nanoparticle layer. For Example C1 and Examples E1-E3, the ZIF-8 coating was made by the method of solvent evaporation-induced formation of a continuous ZIF-8 layer at elevated temperature. The highly concentrated ZIF-8 precursor solution infiltrated into the MFI inter-particle/inter-sheet spaces, and solvent evaporation induced supersaturation and ZIF-8 crystallization.

Table 1 contains the detailed thickness estimates of each layer in the membranes of Example C1 and Examples E1-E3. The estimated thickness of each layer in the membranes of Example C1 and Examples E1-E3 membranes was obtained from SEM image measurements. Each value was measured from at least three cross-sections obtained at different locations of an individual sample, and averaged with three independently fabricated samples. The four types of layers are listed as defined in FIG. 4, Layer A: pure ZIF-8, Layer B: ZIF-8/MFI nanoparticle ANHM, Layer C: ZIF-8/MFI nanosheet ANHM, and Layer D: ZIF-8 penetrated into the bulk alumina support.

TABLE I

| | CE1 | | Example 1 | | Example 2 | | Example 3 | |
|---|---|---|---|---|---|---|---|---|
| Layer Index | Thickness [μm] | % of total thickness | Thickness [μm] | % of total thickness | Thickness [μm] | % of total thickness | Thickness [μm] | % of total thickness |
| A | 0.42 ± 0.11 | 6 | 0.48 ± 0.21 | 10 | 0.34 ± 0.08 | 19 | 0.24 ± 0.06 | 12 |
| B | — | — | 1.51 ± 0.26 | 31 | — | — | 0.72 ± 0.12 | 37 |
| C | — | — | — | — | 0.16 ± 0.04 | 8 | 0.16 ± 0.06 | 8 |
| D | 6.86 ± 2.98 | 94 | 2.81 ± 0.56 | 59 | 1.37 ± 0.45 | 73 | 0.79 ± 0.07 | 40 |
| Total | 7.28 ± 2.99 | 100 | 4.80 ± 0.59 | 100 | 1.87 ± 0.49 | 100 | 1.95 ± 0.15 | 100 |

Figure 5D:
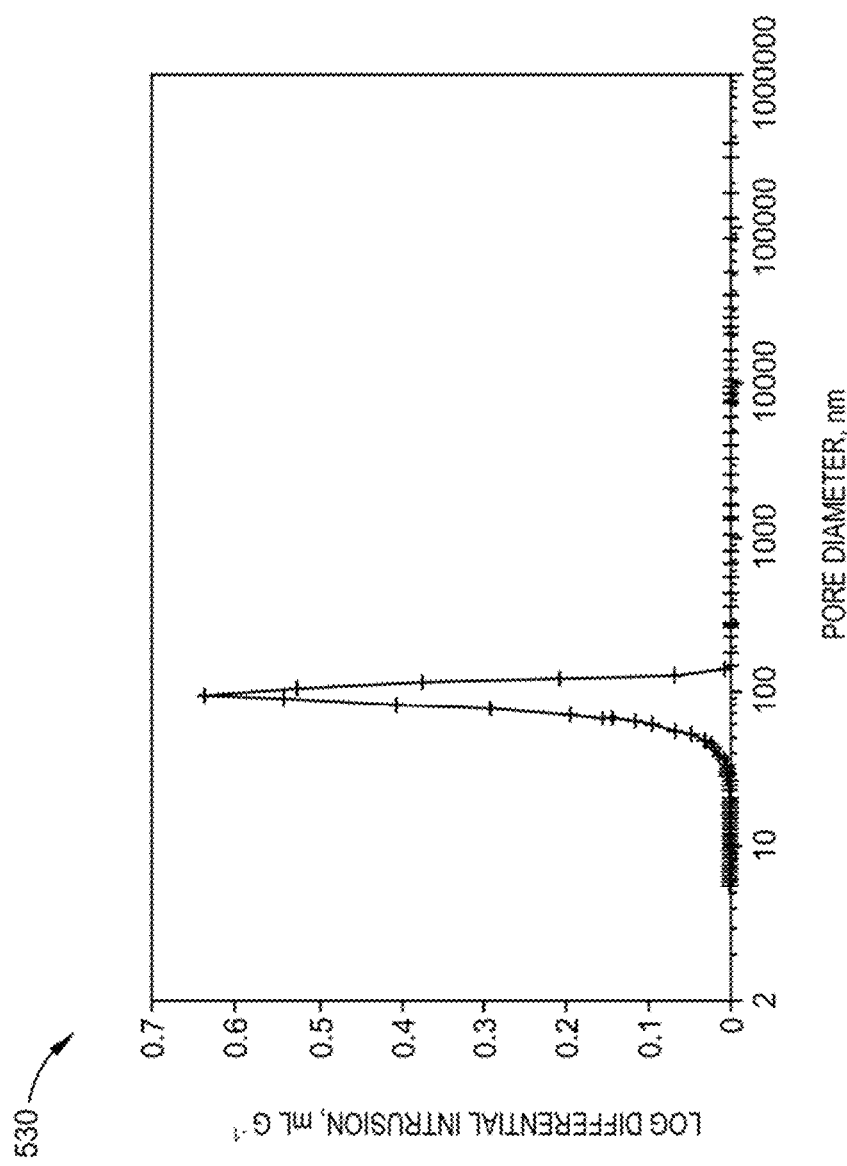
FIG. 5D illustrates a plot of pore size distribution of an alpha-alumina support.

FIG. 5A illustrates a top-view of an SEM image 500 of an alumina support, formed according to implementations described herein. FIG. 5B illustrates an atomic force microscopy (AFM) image 510 of the surface morphology of the alpha-alumina support coated with MFI nanoparticles. FIG. 5C illustrates an atomic force microscopy (AFM) image of the surface morphology of a bare alpha-alumina support. FIG. 5D illustrates a plot 530 of pore size distribution of an alpha-alumina support. The alumina support depicted in FIG. 5A has an effective macropore size of 87 nm as shown in FIG. 5D and a coarse surface texture with an RMS roughness (measured with AFM) of ~140 nm as shown in FIG. 5B and FIG. 5C. After dip coating with a ~1.5 μm layer of ~104 nm closely packed MFI nanoparticles, the surface roughness of the alpha-alumina support decreased to ~40 nm.

Figure 6:
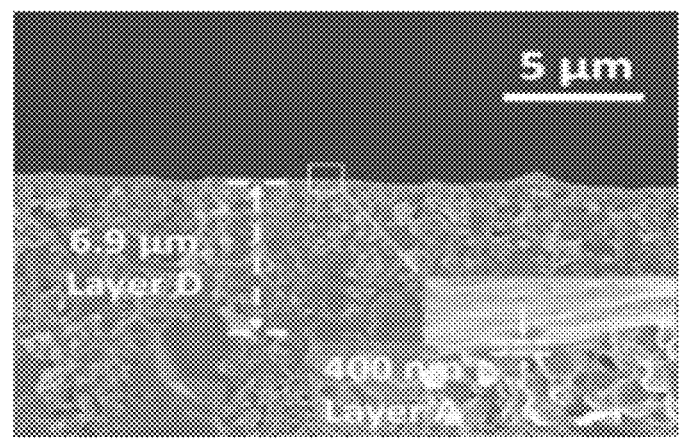
FIG. 6 illustrates a side view of an SEM image of a membrane containing an alpha-alumina support coated with a ZIF-8 coating according to one or more implementations of the present disclosure.

FIG. 6 illustrates a side view of an SEM image of a membrane 600 containing an alpha-alumina support coated with a ZIF-8 coating according to one or more implementations of the present disclosure. The membrane depicted in FIG. 6 is the membrane of Example C1. Deposition of the ZIF-8 coating on the bare alpha-alumina support resulted in an approximately 400 nm ZIF-8 surface layer (Layer A) and severe penetration of the ZIF-8 (~7 µm) into the bulk of the support (Layer D).

Figure 7A:
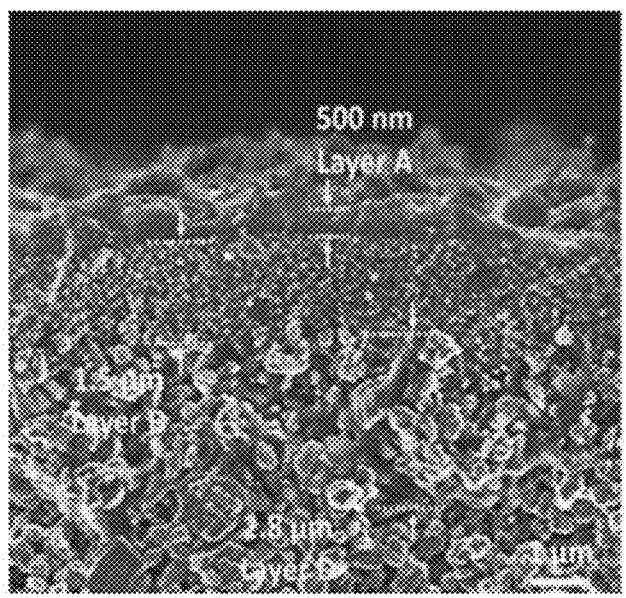
FIG. 7A illustrates a side view of an SEM image of a membrane containing an alpha-alumina support coated with an MFI nanoparticle coating followed by a ZIF-8 coating according to one or more implementations of the present disclosure.
Figure 7B:
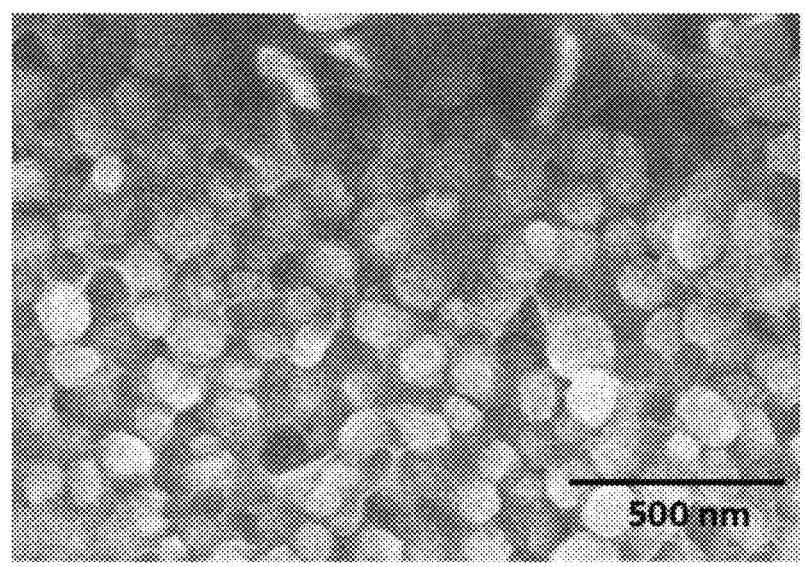
FIG. 7B illustrates a side view of a high-magnification SEM image of the membrane of FIG. 7A according to one or more implementations of the present disclosure.
Figure 7C:
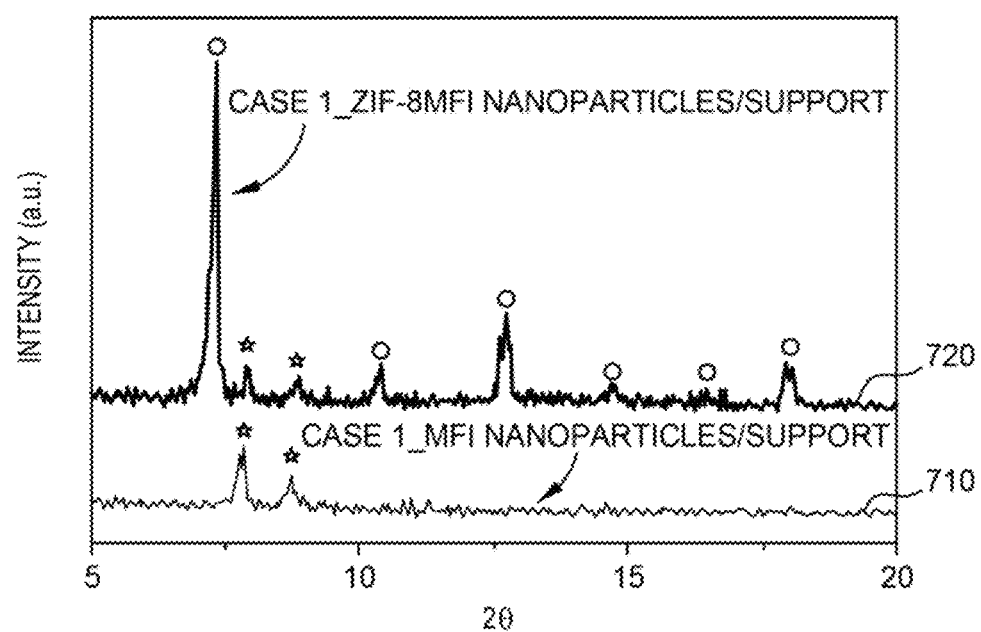
FIG. 7C illustrates a plot of 2Θ(°) vs. intensity (AU) showing XRD patterns of both the ZIF-8 and MFI nanoparticle diffraction peaks of the membrane of FIG. 7A according to one or more implementations described herein.

FIG. 7A illustrates a side view of an SEM image of a membrane 700 containing an alpha-alumina support coated with an MFI nanoparticle coating followed by a ZIF-8 coating according to one or more implementations of the present disclosure. FIG. 7B illustrates a side view of a high-magnification SEM image of the membrane 700 of FIG. 7A according to one or more implementations of the present disclosure. FIG. 7C illustrates a plot of 2Θ(°) vs. intensity (AU) showing XRD patterns of both the ZIF-8 and MFI diffraction peaks of the membrane 700 of FIG. 7A according to one or more implementations described herein. As shown in FIG. 7A the same ZIF-8 deposition conditions used for membrane 700 on the MFI nanoparticle-coated support led to the multilayered membrane of Example E1. The membrane 700 includes a thin (approximately 500 nm) ZIF-8 top Layer A, a ZIF-8/MFI nanoparticle ANHM Layer B (approximately 1.5 µm), and a much lower extent of penetration (approximately 2.8 µm) of ZIF-8 into the bulk alpha-alumina support (Layer D). In the ANHM layer, the ZIF-8 and MFI nanoparticles showed excellent adhesion into a single composite material, as shown in FIG. 7A as well as in the high-magnification SEM image of FIG. 7B. The dual-phase nature of the intermediate ZIF-8/MFI Layer B in the Example E1 membrane is evident in the XRD pattern of FIG. 7C, which shows both the ZIF-8 and MFI diffraction peaks. Trace 710 depicts an XRD pattern after coating of MFI materials only whereas Trace 720 depicts an XRD pattern after coating of both MFI materials followed by ZIF-8. The MFI peaks are denoted by the asterisks (*) and the ZIF-8 peaks are denoted by the circles (o). In FIG. 7C, the signals from MFI nanoparticles are visible throughout. The existence of the MFI nanoparticle layer reduces the penetration of the ZIF-8 in the alumina support (i.e. the Layer D thickness), and the overall membrane thickness is dramatically reduced from Example C1 (7.3 µm) to Example E1 (4.8 µm). Example E1 also demonstrated more uniform thickness than Example C1, with a smaller standard deviation as shown in Table 1.

Figure 8A:
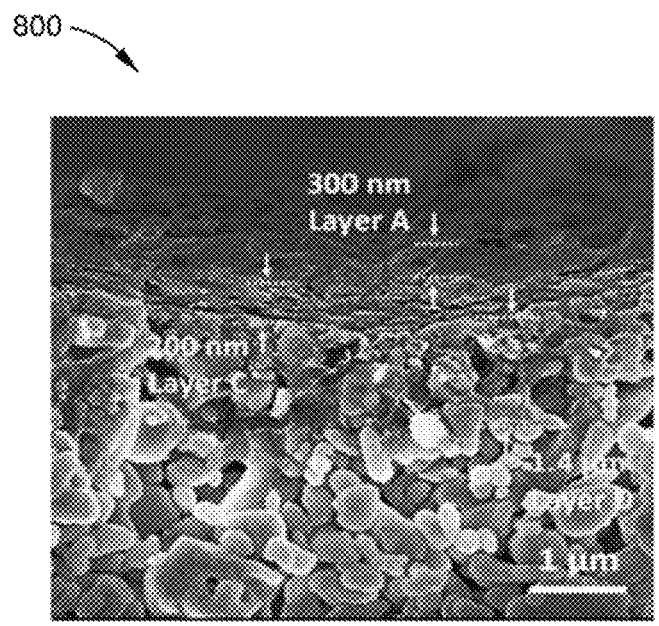
FIG. 8A illustrates a side view of an SEM image of a membrane containing an alpha-aluminum support coated with an MFI nanosheet coating followed by a ZIF-8 coating according to one or more implementations of the present disclosure.
Figure 8B:
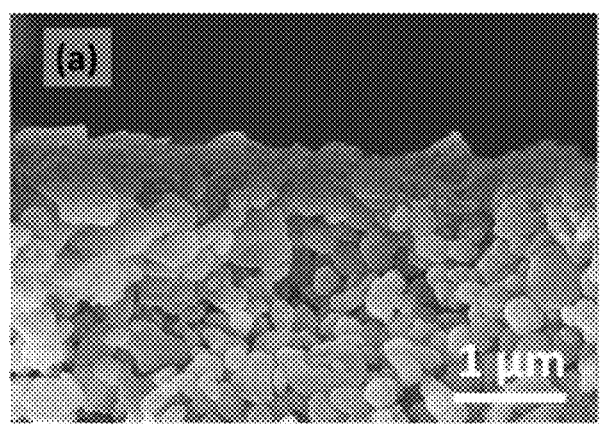
FIG. 8B illustrates a side view of a high-magnification SEM image of the MFI nanosheet coating of FIG. 8A prior to ZIF-8 coating according to one or more implementations of the present disclosure.
Figure 8C:
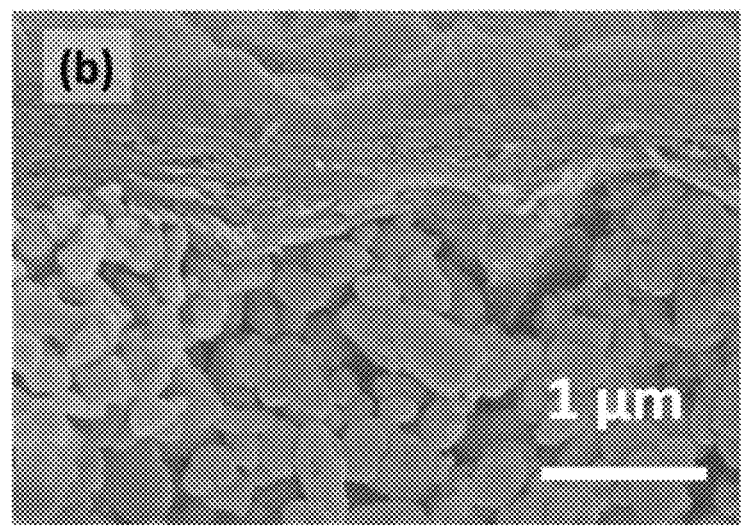
FIG. 8C illustrates a side view of a high-magnification SEM image of the MFI nanosheet coating of FIG. 8A after ZIF-8 coating according to one or more implementations of the present disclosure.

FIG. 8A illustrates a side view of an SEM image of a membrane 800 containing an alpha-alumina support coated with an MFI nanoparticle coating followed by a ZIF-8 coating according to one or more implementations of the present disclosure. FIG. 8B illustrates a side view of a high-magnification SEM image of the MFI nanosheet coating of FIG. 8A prior to ZIF-8 coating according to one or more implementations of the present disclosure. FIG. 8C illustrates a side view of a high-magnification SEM image of the MFI nanosheet coating of FIG. 8A after ZIF-8 coating according to one or more implementations of the present disclosure. Although the ZIF-8/MFI nanoparticle (Layer B) forms a highly permeable dual-phase ANHM layer and also retards the penetration of the ZIF-8 precursors into the bulk alumina support, the packing of sphere-like nanoparticles is not believed to be the ideal physical barrier to precursor infiltration. Instead, the use of the 2D MFI nanosheet (Layer C) is believed to have a larger barrier effect due to the high aspect ratio (approximately 100) of the nanosheets. The membrane 800 includes a thin (approximately 300 nm) ZIF-8 top (Layer A), a ZIF-8/MFI nanosheet ANHM (Layer C) (approximately 200 nm), and a much lower extent of penetration (approximately 1.4 µm) of ZIF-8 into the bulk alpha-alumina support (Layer D). As shown in FIG. 8A, the initial 2D MFI nanosheet layer coating is about 200 nm in thickness. After the ZIF-8 deposition process, the resulting membrane of Example E2 demonstrated further reduction of the overall thickness (to 1.9 µm) from Example E1, mainly due to the further reduction of the ZIF-8 infiltration into the alumina support (Layer D, Table 1). The higher-magnification SEM cross-section image of FIG. 8B shows a compact ZIF-8 (Layer A) and the SEM cross-section image of FIG. 8C shows clear infiltration of ZIF-8 between the MFI nanosheets to form a ZIF-8/MFI nanosheet ANHM (Layer C). EDX elemental mapping of the membrane 800 reveals the presence of co-existence of 2D MFI nanosheets and ZIF-8 in the Layer C.

Figure 8D:
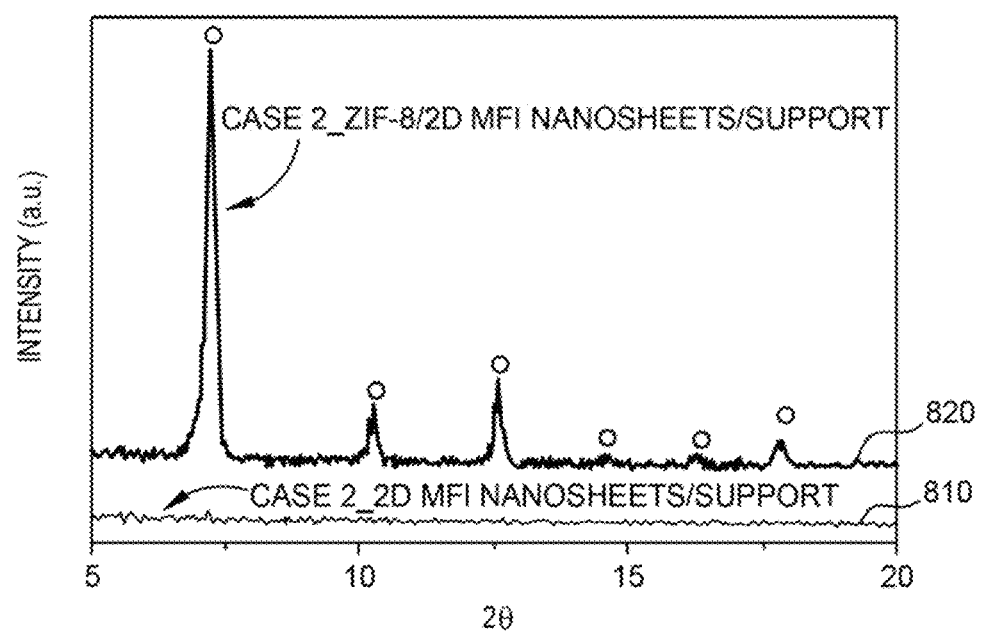
FIG. 8D illustrates a plot of 2Θ(°) vs. intensity (AU) showing XRD patterns of both the ZIF-8 and MFI nanosheet diffraction peaks of the membrane of FIG. 8A according to one or more implementations described herein.

FIG. 8D illustrates a plot of 2Θ(°) vs. intensity (AU) showing XRD patterns of both the ZIF-8 and MFI nanosheet diffraction peaks of the membrane of FIG. 8A according to one or more implementations described herein. Trace 810 depicts an XRD pattern after coating of MFI nanosheets only whereas Trace 820 depicts an XRD patters after coating of both MFI nanosheets followed by ZIF-8. The ZIF-8 peaks are denoted by the circles (o). As expected, the MFI nanosheets do not produce an XRD signal since the MFI nanosheets were exfoliated before deposition on the alpha-alumina support. The existence of the MFI nanosheet layer reduces the penetration of the ZIF-8 in the alumina support (i.e. the Layer D thickness), and the overall membrane thickness dramatically reduces from Example C1 (7.3 µm) to Example E2 (1.9 µm).

Figure 9A:
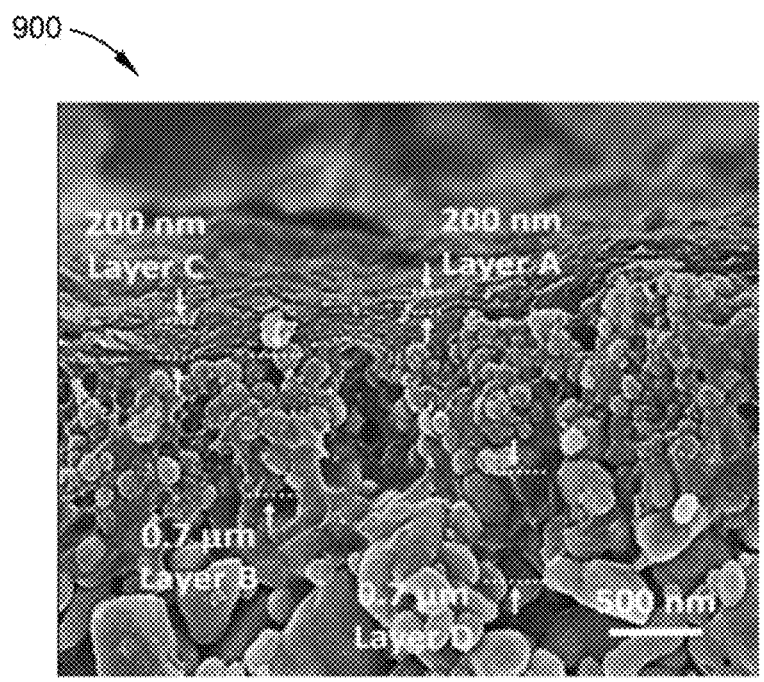
FIG. 9A illustrates a side view of an SEM image of a membrane containing an alpha-alumina support sequentially coated with MFI nanoparticle and MFI nanosheet coatings followed by a ZIF-8 coating according to one or more implementations of the present disclosure.

FIG. 9A illustrates a side view of an SEM image of a membrane 900 containing an alpha-alumina support coated with sequential MFI nanoparticle coatings and MFI nanosheet coatings followed by a ZIF-8 coating according to one or more implementations of the present disclosure. The membrane 900 of Example E3 combines the four types of layers in the order A-C-B-D from top to bottom as shown in FIG. 9A. The membrane 900 includes a thin (approximately 200 nm) ZIF-8 top (Layer A), a ZIF-8/MFI nanosheet ANHM (Layer C) (approximately 200 nm), a ZIF-8/MFI nanoparticle ANHM (Layer B) (approximately 0.7 µm) and a much lower extent of penetration (approximately 0.7 µm) of ZIF-8 into the bulk alpha-alumina support (Layer D). While the presence of both types of MFI-containing Layers B and C is expected to cause a further suppression of the Layer D thickness, an additional advantage of this configuration over Example E2 is that the MFI nanoparticle layer smoothens out the roughness of the underlying alumina support (as seen earlier in FIG. 5B) and provides a highly permeable and smooth underlayer for the coating of the 2D MFI nanosheets. As shown in FIG. 9A and Table 1, the membrane 900 of Example E3 has the lowest overall thickness and the lowest Layer D thickness. Moving from Comparative Example C1 to Example E3 leads to the drastic reduction of the Layer D (ZIF-8 infiltration into alumina) contribution to the overall membrane thickness, from 94% to 40%.

Figure 9B:
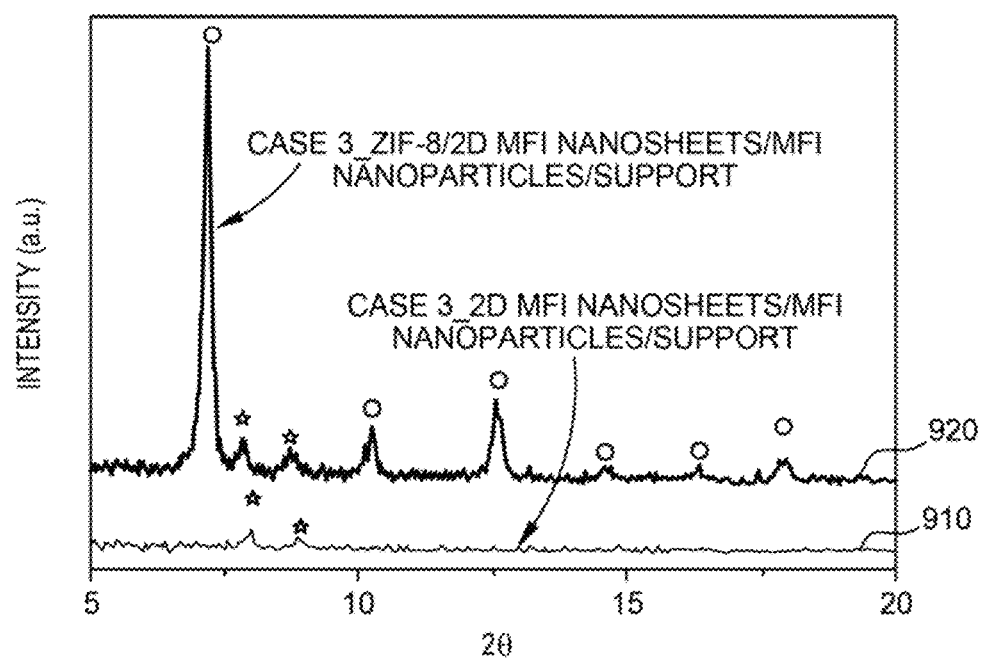
FIG. 9B illustrates a plot of 2Θ(°) vs. intensity (AU) showing XRD patterns of both the ZIF-8 and MFI nanosheets/MFI nanoparticles diffraction peaks of the membrane of FIG. 9A according to one or more implementations described herein.

FIG. 9B illustrates a plot of 2Θ(°) vs. intensity (AU) showing XRD patterns of both the ZIF-8 and MFI nanosheets/MFI nanoparticles diffraction peaks of the membrane 900 of FIG. 9A according to one or more implementations described herein. Trace 910 depicts an XRD pattern after coating of the alpha-alumina support with MFI nanosheets/MFI nanoparticles only whereas Trace 920 depicts an XRD patters after coating of the alpha-alumina support with the MFI nanosheets/MFI nanoparticles followed by ZIF-8. The MFI peaks are denoted by asterisks (*) and the ZIF-8 peaks are denoted by circles (o). There is no XRD signal for the MFI nanosheets as expected since the MFI nanosheets have been exfoliated before deposition on the alpha-alumina support. The existence of the MFI nanosheets/MFI nanoparticles reduces the penetration of the ZIF-8 in the alumina support (i.e. the Layer D thickness), and the overall membrane thickness dramatically reduces from Example C1 (7.3 μm) to Example E3 (1.8 μm).

FIGS. 7C, 8D, and 9B illustrate the X-Ray diffraction patterns for membranes 700, 800, 900 of Example E1, Example E2, and Example E3 respectively. The XRD patterns of FIGS. 7C, 8D, and 9B confirm the formation of ZIF-8. It is also noted that the transport paths available to molecules in the ANHM layers can be manipulated by switching from Example E1 (Layer B) to Example E2 (Layer C). In Layer B, spherically-shaped MFI nanoparticles of larger pore size (>0.5 nm) are embedded in the ZIF-8 matrix of smaller pore size (~0.4 nm), whereas in Layer C the 2D MFI nanosheets of larger pore size (>0.5 nm) are sandwiched between ZIF-8 regions of smaller pore size (~0.4 nm) in a manner that approximates a series-resistance type transport of molecules.

Figure 10:
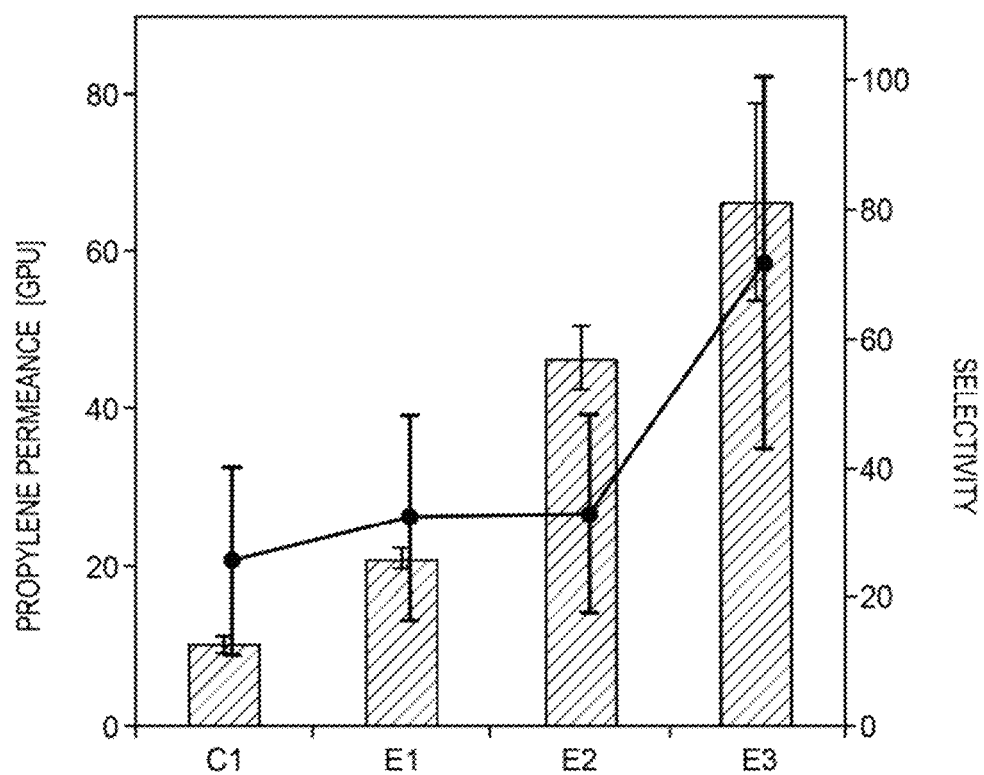
FIG. 10 illustrates a plot of the equimolar binary $C_3H_6$/$C_3H_8$ mixture permeation properties of membranes formed according to one or more implementations of the present disclosure.

FIG. 10 illustrates a plot of the equimolar binary $C_3H_6/C_3H_8$ mixture permeation properties of Example C1 and Examples E1-E3. The equimolar $C_3H_6/C_3H_8$ binary mixture separation properties of the membranes of Example C1 and Examples E1-E3 were measured with a steady-state Wicke-Kallenbach technique at 298 K with an equimolar feed mixture at 1 bar pressure and with argon sweep gas on the permeate side. The permeance unit is 1 GPU=$3.348 \times 10^{10}$ mol·m$^{-2}$·s$^{-1}$·Pa$^{-1}$. Error bars were obtained by measuring three independently fabricated membrane samples for each case. In the case of an equimolar binary feed mixture and use of sweep gas flow on the permeate side, the separation factor is essentially equal to the membrane selectivity (the latter being defined as the ratio of the permeances of the two components). The observed permeances and separation factors demonstrate a number of interesting and significant features, which can be understood with the help of the microstructural characteristics shown in Table I. The numerical values of the $C_3H_6$ and $C_3H_8$ permeances and separation factors are listed in Table II.

TABLE II

| Membrane | $C_3H_6$ permeance (GPU) | $C_3H_8$ permeance (GPU) | $C_3H_6/C_3H_8$ Selectivity* |
|---|---|---|---|
| Example C1 | 10.2 ± 1.0 | 0.6 ± 0.4 | 25.5 ± 14.6 |
| Example 1 | 21.4 ± 1.3 | 0.7 ± 0.5 | 32.1 ± 16.0 |
| Example 2 | 46.5 ± 1.0 | 1.5 ± 0.6 | 32.7 ± 15.3 |
| Example 3 | 66.4 ± 12.5 | 1.0 ± 0.5 | 71.7 ± 28.9 |

The membrane of Example C1 (pure ZIF-8) have a low permeance of approximately 10 GPU as well as a low separation factor of approximately 25 (a good-quality ZIF-8 membrane typically has a $C_3H_6/C_3H_8$ separation factors of 50-150). Not to be bound by theory, but it is believed that the low permeance is a result of the deep infiltration of ZIF-8 into the support (Layer D, see Table I). The low separation factor indicates that the infiltrated layer is also of defective quality and may have void/low-density regions or incompletely crystallized regions. This behavior highlights the practical difficulty of performance limitations associated with fabricating ZIF-8 membranes by simple coatings on readily available support materials. The membranes of Example E1 (containing ZIF-8 and MFI nanoparticles) show significant improvement over the membranes of Comparative Example C1 with doubling of permeance (approximately 20 GPU) as well as increase in separation factor (approximately 30). Qualitatively, the permeance increase is understood in terms of the large reduction of the infiltrated layer (Table I), while the selectivity increase is understood in terms of the increased influence of the other two layers—Layer B (ZIF-8/MFI nanoparticle ANHM) and Layer A (pure ZIF-8 top layer)—relative to the infiltrated Layer D. With the membranes of Example E2 (containing ZIF-8 and MFI nanosheets), a further increase in permeance (approximately 45 GPU) is observed with the same separation factor as in Example E1. The permeance increase can again be understood in terms of the continuing reduction of overall membrane thickness, mainly due to the reduction of Layer D (infiltration) but also due to the replacement of Layer B by the much thinner Layer C (ZIF-8/MFI nanosheet ANHM). However, the membranes of Example E3 (containing all four Layers A-D) show the most dramatic effects: a large increase in both the $C_3H_6$ permeance (approximately 65 GPU) and in the separation factor (approximately 70).

Referring to Table I, the further increase in permeance over Example E2 cannot be simply explained by overall thickness reduction since the thickness is not significantly lower than Example E2. Rather, the increased permeance is believed to be the result of the greatly increased contribution of the two highly permeable ANHM layers (Layers B and C) to the overall membrane thickness relative to the infiltrated Layer D. The same factor seems to be also responsible for the drastic increase in the separation factor of the membranes of Example E3. While the membranes of Example E1 and Example E2 show increased selectivity over the membranes of Comparative Example C1 due to the higher quality of the ANHM layers (Layer B and Layer C), a large influence of the defective infiltrated Layer D is still present. With the much lower influence of Layer D in the membranes of Example E3, the high-quality ANHM layers are able to increase the membrane performance substantially.

To obtain more quantitative insight on the properties of the ZIF-8/MFI ANHMs, in particular the properties of the two ANHM layers (Layer B and Layer C) in the membranes of Examples E1-E3, the permeance data of Table II was analyzed using the series-resistance model of permeation in a multi-layered membrane (Equations S1-S4, below). A basic assumption for this analysis was that the fundamental permeability and selectivity characteristics of any particular layer are approximately the same wherever encountered in the four types of membranes, for example, the permeability and selectivity characteristics of Layer B (ZIF-8/MFI nanoparticle layer) remain the same across Example E1 and Example E3 membranes even though the Layer B thicknesses may differ across these membranes as shown in Table I. This assumption is quite reasonable since all the membranes (Examples C1-E3) were synthesized under very similar conditions. It was also assumed that the permeance of the underlying bare alpha-alumina support can be neglected from the analysis, since it is much higher (approximately 7000 GPU for $C_3H_6$) than the permeances of the membranes of Examples C1-E3. The thicknesses of each layer in the membranes was taken from the experimental data of Table 1, and the total measured permeances are taken from the experimental data of Table II. By applying Equation S1 sequentially to the membranes of Examples C1-E3, the $C_3H_6$ and $C_3H_8$ permeabilities and $C_3H_6/C_3H_8$ selectivities of all four layers A-D was estimated.

Additionally, error propagation calculations were conducted to quantify the uncertainties in the obtained permeabilities and selectivities based upon the known error bars on the measured input quantities. The results of this analysis are shown in Table III.

TABLE III

| Layer | $C_3H_6$ permeability (Barrer) | $C_3H_8$ permeability (Barrer) | $C_3H_6/C_3H_8$ Selectivity |
|---|---|---|---|
| A | 154 ± 47 | 3.8 ± 2.4 | 41 ± 29 |
| B | 322 ± 93 | 1.5 ± 0.6 | 220 ± 112 |
| C | 492 ± 21 | 0.6 ± 0.3 | 818 ± 394 |
| D | 195 ± 14 | 11.9 ± 2.1 | 16 ± 3 |

Estimated $C_3H_6$ and $C_3H_8$ permeabilities and $C_3H_6/C_3H_8$ selectivities of the four individual Layers A-D at 298 K, was obtained by solving Equations S1-S4 simultaneously for the four membranes of Examples C1-E3. Layer thicknesses were taken from Table I and membrane permeance data were taken from Table II. The listed numerical values of the layer permeabilities and selectivities should be considered as approximate due to the model assumptions listed above and the error propagation. However, the results lead to three conclusions. First, both Layer A (ZIF-8 top layer) and Layer D (infiltrated ZIF-8 layer) are defective and have low selectivities. Attempts to develop simple methods of coating ZIF-8 membranes directly on inexpensive, non-tailored supports (Example $C_1$) often result in defective membranes that would require substantial effort in optimizing the synthesis conditions to improve their properties. As also seen experimentally in Table I, infiltration into the support is the main contributor to low membrane permeance in the membranes of Example C1. Second, ANHM Layers B and C are of very high quality in terms of both permeability and selectivity and provide a large boost in the membrane performance. In terms of permeability, the use of 2D MFI nanosheets with out-of-plane oriented channels leads to the most dramatic increase in permeability seen in Layer C. Third, the microstructures of the two ANHM Layers B and C are likely to be quite different from a simple combination of the known ZIF-8 and MFI crystal lattice structures. This is particularly evident from the estimated selectivities of these two layers in Table III, which are equivalent or even higher than what is expected in a "defect-free" pure ZIF-8 membrane. This finding was surprising, since the MFI nanoparticles and nanosheets by themselves were expected to have a low $C_3H_6/C_3H_8$ intrinsic selectivity (<3) on account of their larger pore size than ZIF-8.

In the present Layers B and C, the MFI volume fractions are clearly very high (most likely 50% or more), given the closely packed MFI nanoparticles or stacked MFI nanosheets. Therefore, the overall experimentally obtained properties of the ANHMs, as well as the estimated Layer B and Layer C permeabilities obtained from the model analysis of the experimental data, can be explained if one considers that the properties of the ZIF-8 material in Layer B and Layer C are different from those of "bulk" ZIF-8. In other words, the crystallization of the ZIF-8 matrix in the confined microscopic spaces between the densely-packed MFI nanoparticles/nanosheets may lead to the formation of crystalline regions with considerably smaller effective ZIF-8 pore size than that of bulk ZIF-8 (perhaps as a consequence of greater rigidity of the confined ZIF-8 lattice). In fact, such effects in ZIF-8 have been shown to be induced with surprising ease by factors such as the application of electric fields. Additionally, the structure of the nanoscopic interfaces between the ZIF-8 and MFI regions is unknown, and these interfaces may have significantly different selectivity than bulk ZIF-8. Finally, as shown in FIG. 11, the estimated Layer B and Layer C properties from Table II are compared with literature data on single-phase nanoporous membranes and polymer-based membranes.

Figure 11:
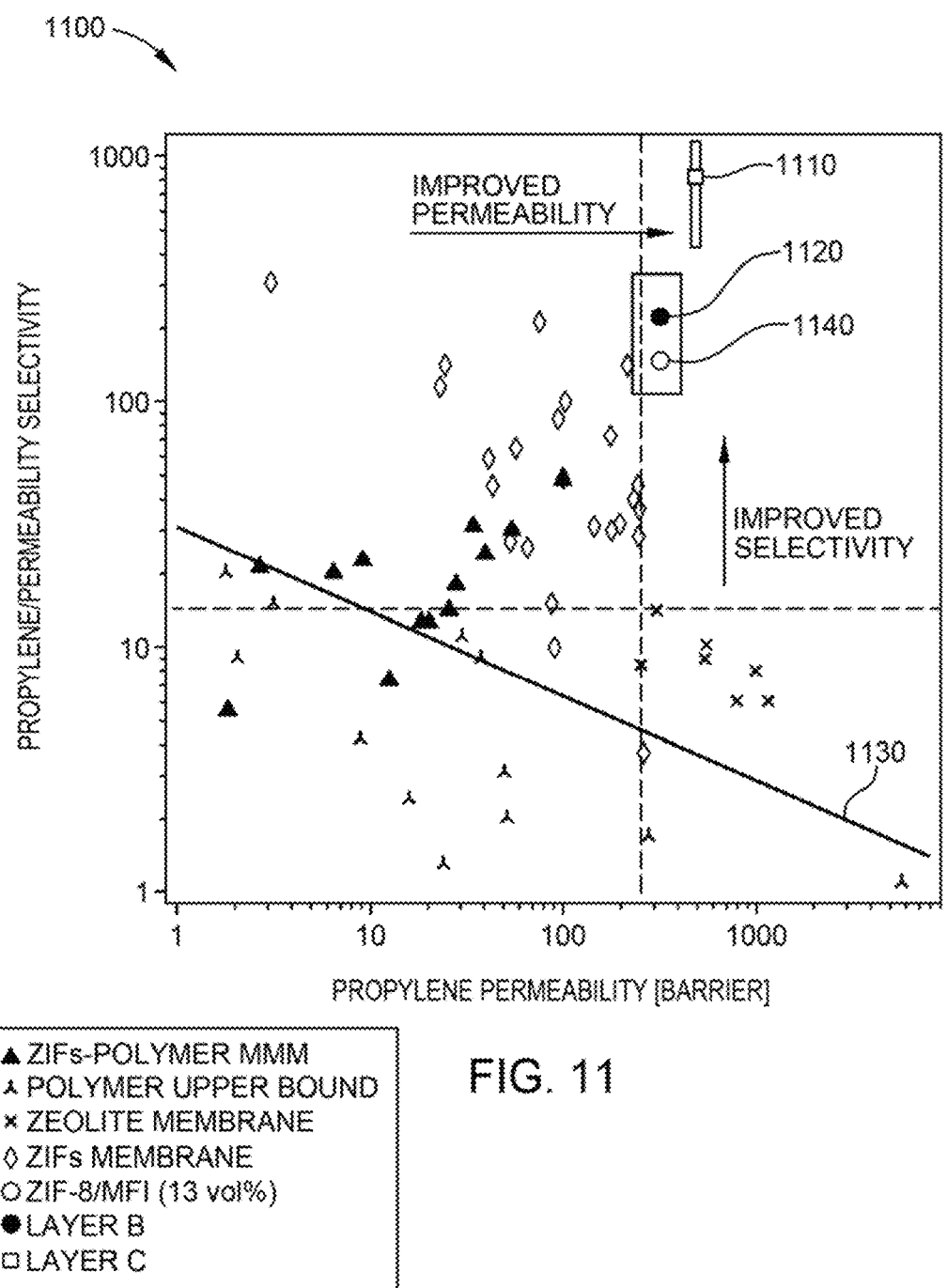
FIG. 11 shows a Robeson-type plot of membrane permeability versus selectivity for materials which have been successfully fabricated and studied for $C_3H_6$/$C_3H_8$ separation.

FIG. 11 shows a Robeson-type plot 1100 of membrane permeability versus selectivity for materials which have been successfully fabricated and studied for $C_3H_6/C_3H_8$ separation. Only materials with $C_3H_6$ permeability >1 Barrer (=3.348×10$^{16}$ mol·m$^{-1}$·s$^{-1}$·Pa$^{-1}$) are shown for clarity, since $C_3H_6$ permeabilities lower than 1 Barrer are not technologically significant. The Robeson-type plot 1100 shows the estimated $C_3H_6$ permeabilities and the $C_3H_6/C_3H_8$ selectivities of the present Layer B (1110) and Layer C (1120) with membranes reported in the literature. The rectangles drawn around the Layer B and Layer C symbols depict the uncertainty ranges in the model estimates as given in Table III. Solid line 130 represents the approximate polymer upper bound based upon the polymer upper bound symbols. The squares represent zeolite membranes. The solid triangles represent ZIF-8/polymer mixed-matrix membranes. The diamonds represent ZIF-8 membranes. The open circle (1140) represents ZIF-8/MFI nanoparticle ANHM membranes synthesized by the IMMP method.

As is well known, polymeric materials have difficulty in overcoming the permeability-selectivity tradeoff (also called the Robeson 'upper bound'), whereas polymer-nanoporous material 'mixed-matrix membranes' (MMMs) are able to access a limited region above the upper bound. Among the pure nanoporous membranes fabricated so far, zeolite membranes such as FAU and ETS-10 have shown high permeabilities (500-1000 Barrer) but rather low selectivity in mixture permeation. On the other hand, MOF membranes based upon ZIF-8 or ZIF-67 show excellent separation factors but are limited to lower permeabilities 300 Barrer) due to their smaller pore sizes. However, the all-nanoporous hybrid membrane (ANHM) approach described herein is able to target a previously inaccessible region of high permeability and high selectivity that has not been possible to attain with single-phase nanoporous materials. In particular, the present Layer C (ZIF-8/2D MFI nanosheet ANHM)—and also the previously demonstrate ZIF-8/MFI nanoparticle ANHM are able to move into the extreme right region of the Robeson plot. Their permeabilities are considerably higher than that of pure ZIF membranes while maintaining (or perhaps even exceeding, due to not-yet-understood effects) selectivities.

The ANHM approach to multiphase membranes has been disclosed, in the particular context of nanoporous membranes for propylene/propane separation. The combination of a ZIF-8 matrix with high volume fractions of zeolite MFI nanoparticles and/or high-aspect-ratio nanosheets can be used to fabricate a variety of multilayer ANHM structures. In addition to formation of ANHM layers, the presence of MFI nanoparticle and nanosheet coatings prior to ZIF-8 crystallization is effective in preventing infiltration of the ZIF-8 precursor solution into the support. This leads to a substantial increase in propylene permeances, while the ANHM layers impart high propylene/propane selectivity. Detailed investigation of microstructure-permeation property relationships reveals a synergistic performance enhancement effect in the ANHM layers. Specifically, the propylene/propane separation selectivity of the ZIF-8/MFI ANHMs is found to be very high in relation to expected values based upon the individual "bulk" material properties. Not to be bound by theory but it is believed that this finding can be explained by subtle alterations in the structure (or structural rigidity) of ZIF-8 during crystallization in the microscopic regions surrounding the closely packed MFI nanoparticles or closely stacked MFI nanosheets. It can also be expected that the fabrication of ANHMs with different MOF/zeolite or MOF/MOF combinations can lead to a large new class of membranes with unprecedented separation properties. Furthermore, the relatively simple approach based upon precursor/nanoparticle coatings and subsequent evaporative crystallization of membranes on low-cost supports could also accelerate the scale-up of ANHMs.

Characterization:

XRD patterns were measured on a PANalytical X'Pert Pro diffractometer at room temperature using Cu Kα radiation and a scanning range of 5-40° 2θ. Surface and cross-section SEM images of the membranes were collected with a Hitachi SU8010 Ultra-High Resolution scanning electron microscope FE-SEM. TEM images were collected by a FEI Tecnai 30 at an acceleration voltage of 300 kV. Atomic force microscopy (AFM) images of inner surfaces of the hollow fibers were obtained with an ICON Dimension® scanning probe microscope (Bruker). The AFM was operated under tapping mode with Mikromasch NSC14 silicon cantilevers (8 nm tip radius, 5 N/m force constant, and 160 kHz typical resonance frequency). Mixed gas permeation measurements were carried out with the Wicke-Kallenbach technique at 298 K. Argon was used as a sweep gas at the permeate side, whose pressure will be maintained at one bar during permeation measurements. An online gas chromatography unit (GC2014, Shimadzu) was used to determine the permeate composition.

Consider the general membrane assembly of Example E3 with four layers: Layer A: pure ZIF-8, Layer B: ZIF-8/MFI nanoparticle ANHM, Layer C: ZIF-8/MFI nanosheet ANHM, and Layer D: ZIF-8 penetrated into the bulk alumina support. For any permeating species, the permeance (in units of GPU) of the overall membrane assembly can be derived assuming the resistance-in-series model:

$$\bar{P}_{overall} = \frac{1}{\frac{L_A}{\bar{P}_A} + \frac{L_B}{\bar{P}_B} + \frac{L_C}{\bar{P}_C} + \frac{L_D}{\varepsilon \bar{P}_D}} \quad (1)$$

Here, $L_i$ denotes the thickness of the layer i=A, B, C, D (in units of μm) and $P_i$ denotes the permeability (in units of Barrer) of the layer. For Layer D, which is infiltrated into the porous alumina support, the additional factor ε (porosity of the support) is present, and $P_D$ represents the intrinsic permeability of the ZIF-8 material infiltrated in the pores of the support. Here, ε=0.37 is used as obtained from mercury porosimetry on the alumina support. Equation 1 can be applied to the other Examples C1, E1, and E2 by simply eliminating the terms on the right-hand side for layers that are not present in the membrane. Thus, for any permeating species, a set of four nonlinear equations can be written corresponding to each of Examples C1-E3 (see Equations S1-S4). Given the experimental overall permeances (Table II) and individual layer thicknesses (Table I) for each membrane, the four equations are solved simultaneously to obtain the four permeabilities $P_A$, $P_B$, $P_C$ and $P_D$ for the same permeating species. The above procedure was carried out for both propylene and propane permeants, and the results are summarized in Table III. The error propagation analysis for this model is also summarized below.

Series-Resistance Model of Permeation in a Multi-Layered Membrane

Based on the series-resistance model of permeation in a multi-layered membrane, the experimentally observed permeances of the same molecular species in each type of membrane (Example C1-E3) can be written as follows:

$$\frac{1}{\bar{P}_{C1}} = \frac{l_{A,0}}{\bar{P}_A} + \frac{l_{D,0}}{\bar{P}_D} \quad \text{(Equation S1)}$$

$$\frac{1}{\bar{P}_{E1}} = \frac{l_{A,1}}{\bar{P}_A} + \frac{l_{B,1}}{\bar{P}_B} + \frac{l_{D,1}}{\bar{P}_D} \quad \text{(Equation S2)}$$

$$\frac{1}{\bar{P}_{E2}} = \frac{l_{A,2}}{\bar{P}_A} + \frac{l_{C,2}}{\bar{P}_C} + \frac{l_{D,2}}{\bar{P}_D} \quad \text{(Equation S3)}$$

$$\frac{1}{\bar{P}_{E3}} = \frac{l_{A,3}}{\bar{P}_A} + \frac{l_B}{\bar{P}_B} + \frac{l_C}{\bar{P}_C} + \frac{l_D}{\bar{P}_D} \quad \text{(Equation S4)}$$

where $I_{i,j}$ (with i=Layer A, B, C, D and j=Membrane examples C1, E1, E2, E3) are the experimentally observed thicknesses of a layer of type i found in a membrane of type j. To obtain the intrinsic permeabilities of the four types of Layers A-D ($\bar{P}_i$, with i=A, B, C, D), the four nonlinear algebraic equations (S1-S4) are solved simultaneously, with the experimental permeance values and the thickness values being obtained from Table I and Table II.

Error Propagation Analysis

According to well-known error propagation principles, consider a model Y(X) which takes as input a set of measured parameter values X=($x_1$, $x_2$, . . . $x_m$) and yields a set of predicted values Y=($y_i$, $y_2$, . . . $y_n$). In the present case, for any given molecular species, our model (Equations S1-S4) has a total of m=16 measured input parameter values (12 thickness values and 4 membrane permeance values) along with their absolute uncertainty values (listed in Table I and Table II) and yields n=4 output values which are the intrinsic permeabilities of the four types of Layers A-D. With the usual assumption that the probability (error) distributions for each input parameter are symmetric in nature, the squared combined uncertainty ($U_y^2$) for any output value y (subscript dropped for convenience) as a sum of squared uncertainty contributions resulting from each of the 16 measured input parameters:

$$U_y^2 + U_{y,1}^2 + U_{y,2}^2 + \ldots + U_{y,16}^2 \quad \text{(Equation S5)}$$

These individual contributions from parameters $x_i$ (i=1-16) are evaluated by the Euler formula as follows:

$$U_{y,i} = \frac{\partial y}{\partial x_i} U_i \quad \text{(Equation S6)}$$

Here $U_i$ refers to the absolute uncertainty in the value of the measured input parameter $x_i$. For example, $U_{y1,1}$ means the contribution to the uncertainty of output value $y_1$ (the permeability of Layer A) arising from the measured parameter $x_1$ (the thickness of Layer A in Example C1). The absolute uncertainty $U_1$ in the parameter $x_1$ (the thickness of Layer A in Example C1) is obtained from Table 1 as 0.11 μm.

The total uncertainty ($U_y$) for any output value y is obtained by substituting Equation S6 in Equation S5:

$$U_y = \sqrt{\left(\frac{\partial y}{\partial x_1} U_1\right)^2 + \left(\frac{\partial y}{\partial x_2} U_2\right)^2 + \ldots + \left(\frac{\partial y}{\partial x_{16}} U_{16}\right)^2} \quad \text{(Equation S7)}$$

To estimate the partial derivatives, we use the following numerical forward-difference formula:

$$\frac{\partial y}{\partial x} = \frac{-3y(x) + 4y(x + \Delta x) - y(x + 2\Delta x)}{2\Delta x} \quad \text{(Equation S8)}$$

For each measured parameter i, the model Equations S1-S4 were solved three times to obtain the output y-values for the parameter values $x_i$, $x_i+\Delta x_i$, and $x_i+2\Delta x_i$ while keeping all the other parameters fixed. Equation S8 then gives the partial derivatives for that parameter i. The deviation $\Delta x_i$ is chosen as 1-10% of the $x_i$ value depending on the output value sensitivity to the parameter i. Equation S7 then yields the uncertainty values on the layer permeabilities. This analysis is carried out separately for propylene and propane, and the resulting uncertainties in layer permeabilities are shown in Table III. The uncertainty in the selectivities (propylene/propane permeability ratios) are then obtained from the simple error propagation formula for a ratio of two quantities.

The descriptions of the various aspects of the present disclosure have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein. While the foregoing is directed to aspects of the present disclosure, other and further aspects of the present disclosure can be devised without departing from the basic scope thereof.

What is claimed is:

1. A method of forming a molecular separation device, comprising:
    growing or depositing a silica MFI zeolite coating on a ceramic support, the growing or depositing comprising:
        coating the ceramic support with a layer of 3D MFI nanoparticles; and
        coating the layer of 3D MFI nanoparticles with a layer of 2D MFI nanosheets; and
    growing a ZIF-8 coating on the silica MFI zeolite coating, the growing comprising:
        applying a first reactant fluid including a metal salt and a second reactant fluid including an imidazole reactant to the silica MFI zeolite coating; and
        reacting the first and second reactant fluids on the silica MFI zeolite coating to produce the ZIF-8 coating.

2. The method of claim 1, wherein growing or depositing the silica MFI zeolite coating on the ceramic support comprises subjecting the ceramic support to a dip coating process or a vacuum-assisted filtration process.

3. The method of claim 1, wherein the first reactant fluid and the second reactant fluid are mixed prior to applying the first reactant fluid and the second reactant fluid to the silica MFI zeolite coating.

4. The method of claim 3, wherein the metal salt is zinc acetate dihydrate and the imidazole reactant is 2-methylimidazole.

5. The method of claim 1, wherein reacting the first reactant fluid and the second reactant fluid comprises at least one of subjecting to ambient conditions, heating, or crystallizing by cooling past supersaturation.

6. The method of claim 1, wherein the silica MFI zeolite coating and the ZIF-8 coating form a mixed matrix membrane.

7. A method of forming a molecular separation device, comprising:
    growing or depositing a porous, nanocrystalline material comprising a zeolite on a ceramic support, the growing or depositing comprising:
        coating the ceramic support with a layer of 3D MFI nanoparticles; and
        coating the layer of 3D MFI nanoparticles with a layer of 2D MFI nanosheets; and
    growing a porous, polycrystalline material comprising a metal-organic framework (MOF) on the porous, nanocrystalline material comprising the zeolite, the growing comprising:
        applying a first reactant fluid including a metal salt to the porous, nanocrystalline material;
        converting the first reactant fluid to a metal-containing film by solvent evaporation;
        applying a second reactant fluid including an imidazole reactant in vapor form to the ceramic support with the porous, nanocrystalline material; and
        reacting the imidazole reactant in vapor form with the metal-containing film to convert the metal-containing film into the porous, polycrystalline material.

8. The method of claim 7, wherein the zeolite includes a pure-silica MFI zeolite.

9. The method of claim 7, wherein the MOF is a zeolitic imidazolate framework (ZIF).

10. The method of claim 9, wherein the ZIF is selected from ZIF-8, ZIF-90, or a hybrid, mixed-linker ZIF.

11. The method of claim 10, wherein the ceramic support comprises alumina.

12. The method of claim 7, wherein growing or depositing the porous, nanocrystalline material comprising the zeolite on the ceramic support comprises subjecting the ceramic support to a dip coating process or a vacuum-assisted filtration process.

13. The method of claim 7, wherein converting the first reactant fluid to the metal-containing film by solvent evaporation comprises at least one of subjecting to ambient conditions, heating, or crystallizing by cooling past supersaturation.

14. A molecular separation device, comprising:
    a porous, polycrystalline membrane material comprising a metal-organic framework (MOF); and
    a porous, nanocrystalline material comprising a zeolite on a ceramic support,
        wherein the zeolite comprises a layer of 3D MFI nanoparticles and a layer of 2D MFI nanosheets;
        wherein the porous, nanocrystalline material is dispersed within at least a portion of the porous, polycrystalline membrane material;
        wherein the porous, nanocrystalline material provides a plurality of nanoporous structures;
        wherein the molecular separation device has a propylene permeability greater than 100 barrer and a propylene to propane selectivity greater than 100; and
        wherein the porous, polycrystalline membrane material is grown by:
            a first reactant fluid comprising a metal salt applied to the porous, nanocrystalline material;
            the first reactant fluid converted to a metal-containing film by solvent evaporation;
            a second reactant fluid comprising an imidazole reactant applied in vapor form to the ceramic support with the porous, nanocrystalline material; and
            the imidazole reactant in vapor form reacted with the metal-containing film to convert the metal-containing film into the porous, polycrystalline membrane material.

15. The device of claim 14, wherein the MOF includes a zeolitic imidazolate framework (ZIF) and the zeolite includes a pure-silica MFI zeolite.

16. The method of claim 1, wherein the 3D MFI nanoparticles have an average diameter of about 50 nm to about 200 nm.

17. The method of claim 7, wherein the 3D MFI nanoparticles have an average diameter of about 50 nm to about 200 nm.

18. The device of claim 14, wherein the 3D MFI nanoparticles have an average diameter of about 50 nm to about 200 nm.

19. The device of claim 14, wherein the zeolite comprises the layer of 3D MFI nanoparticles coated on the ceramic support and the layer of 2D MFI nanosheets coated on the layer of 3D MFI nanoparticles.

20. The device of claim 14, wherein the zeolite comprises the layer of 2D MFI nanosheets coated on the ceramic support and the layer of 3D MFI nanoparticles coated on the layer of 2D MFI nanosheets.

\* \* \* \* \*